United States Patent
O'Hara

(10) Patent No.: US 12,371,338 B2
(45) Date of Patent: Jul. 29, 2025

(54) SYSTEMS AND METHODS FOR SEPARATING YTTRIUM AND STRONTIUM

(71) Applicant: Battelle Memorial Institute, Richland, WA (US)

(72) Inventor: Matthew J. O'Hara, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 1311 days.

(21) Appl. No.: 16/780,397

(22) Filed: Feb. 3, 2020

(65) Prior Publication Data

US 2021/0238051 A1    Aug. 5, 2021

(51) Int. Cl.
| | | |
|---|---|---|
| C01F 17/00 | (2020.01) | |
| C01F 11/00 | (2006.01) | |
| C01F 17/17 | (2020.01) | |
| C01G 25/00 | (2006.01) | |
| C01G 49/00 | (2006.01) | |
| C22B 26/20 | (2006.01) | |
| C22B 61/00 | (2006.01) | |

(52) U.S. Cl.
CPC ............ *C01F 17/17* (2020.01); *C01F 11/005* (2013.01); *C01G 25/003* (2013.01); *C01G 49/0009* (2013.01); *C22B 26/20* (2013.01); *C22B 61/00* (2013.01)

(58) Field of Classification Search
CPC ...... C01F 17/17; C01F 11/005; C01G 25/003; C01G 49/0009; C22B 26/20; C22B 61/00
USPC .......................................................... 423/2
See application file for complete search history.

(56) References Cited

U.S. PATENT DOCUMENTS

| | | |
|---|---|---|
| 5,368,736 A | 11/1994 | Horwitz et al. |
| 5,512,256 A | 4/1996 | Bray et al. |
| 6,309,614 B1 | 10/2001 | Horwitz et al. |
| 6,972,414 B2 | 12/2005 | Egorov et al. |
| 7,554,098 B2 | 6/2009 | O'Hara et al. |
| 10,344,355 B2 | 7/2019 | Brown et al. |
| 2003/0152502 A1 | 8/2003 | Lewis et al. |
| 2006/0018813 A1 | 1/2006 | Bray |
| 2015/0307965 A1 | 10/2015 | Boudreault et al. |
| 2017/0260606 A1 | 9/2017 | Kasaini |

FOREIGN PATENT DOCUMENTS

| | | |
|---|---|---|
| EP | 21750978 | 3/2024 |
| WO | WO 2001/080251 | 10/2001 |
| WO | WO 2003/051494 | 6/2003 |
| WO | WO 2011/091231 | 7/2011 |
| WO | WO 2014/113742 | 7/2014 |
| WO | PCT/US2021/16105 | 4/2021 |

OTHER PUBLICATIONS

Hernlem et al., "Stability Constants for Complexes of the Siderophore Desferrioxamine B with Selected Heavy Metal Cations", Inorganica Chimica Acta vol. 244, Issue 2, Mar. 1996, Netherlands, pp. 179-184.

(Continued)

*Primary Examiner* — Stefanie J Cohen
(74) *Attorney, Agent, or Firm* — Wells St. John P.S.

(57) ABSTRACT

Systems and methods for separating Y and Sr are provided. The systems and methods provide combinations of solutions, vessels, and/or media that can provide Y solutions of industrially beneficial concentration.

16 Claims, 17 Drawing Sheets

Calculated $^{90}$Sr decontamination factors for each purification run. These factors will continue to rise until $^{90}$Sr/$^{90}$Y reach secular equilibrium. Error bars are a propagation of the uncertainty in the injected $^{90}$Sr activity (±1s) and the uncertainty in the LSA-determined sample activity (±2s).

(56) References Cited

OTHER PUBLICATIONS

Herscheid et al., "Manganese-52m for Direct Application: A New 52Fe/52m Mn Generator Based on a Hydroxamate Resin", International Journal of Applied Radiation and Isotopes vol. 34, Issue 6, Jun. 1983, United Kingdom, pp. 883-886.

Horwitz et al., "Chemical Separations for Super-Heavy Element Searches in Irradiated Uranium Targets", Journal of Inorganic and Nuclear Chemistry vol. 37, Issue 2, Feb. 1975, United Kingdom, pp. 425-434.

Kiss et al., "Metal-Binding Ability of Desferrioxamine B", Journal of Inclusion Phenomena and Molecular Recognition in Chemistry 32, 1998, Netherlands, pp. 385-403.

Lee et al., "Study on the Separation of Carrier-Free Yttrium-90 from Strontium-90", Isotopenpraxis Isotopes in Environmental and Health Studies vol. 27, Issue 6, 1991, United Kingdom, pp. 269-273.

Holland et al., "Standardized Methods for the Production of High Specific-Activity Zirconium-89", Nuclear Medicine and Biology vol. 36, Issue 7, Oct. 2009, United States, pp. 729-739.

Horwitz et al., "Novel Extraction of Chromatographic Resins Based on Tetraalkyldiglycolamides: Characterization and Potential Applications", Solvent Extraction Ion Exchange, 2005, United States, pp. 319-344.

Link et al., "A Simple Thick Target for Production of 89Zr using an 11 MeV Cyclotron", Applied Radiation and Isotopes, 2017, United Kingdom, pp. 211-214.

Meijs, et al., "Production of Highly Pure No-Carrier Added 89Zr for the Labelling of Antibodies with a Positron Emitter", Applied Radiation and Isotopes vol. 45, No. 12, 1994, United Kingdom, pp. 1143-1147.

O'Hara, U.S. Appl. No. 15/788,724, filed Oct. 19, 2017, titled "System and Process for Production of Isotopes and Isotope Compositions", 94 pages.

O'Hara et al., "Hydroxamate Column-Based Purification of Zirconium-89 (89Zr) using an Automated Fluidic Platform", Applied Radiation and Isotopes 132, 2018, United Kingdom, pp. 85-94.

O'Hara et al., "Optimized Anion Exchange Column Isolation of Zirconium-89 (89Zr) from Yttruim Cyclotron Target: Method Development and Implementation on an Automated Fluidic Platform", Journal of Chromatography A, 1545, 2018, Netherlands, pp. 48-58.

O'Hara et al., "Tandem Column Isolation of Zirconium-89 from Cyclotron Bombarded Yttrium Targets using an Automated Fluidic Platform: Anion Exchange to Hydroxamate Resin Columns", Journal of Chromatography A, 1567, 2018, Netherlands, pp. 37-46.

Siikanen et al., "A Peristaltic Pump Driven 89Zr Separation Module", 14th International Workshop on Targetry and Target Chemistry, American Institute of Physics in Playa del Carmen, Mexico, 2012, United States, pp. 206-210.

Verel et al., "89Zr Immuno-PET: Comprehensive Procedures for the Production of 89Zr-Labeled Monoclonal Antibodies", Journal of Nuclear Medicine 44, 2003, China, pp. 1271-1281.

Wooten et al., "Routine Production of 89Zr using an Automated Module", Applied Sciences, Mar. 2013, Switzerland, pp. 593-613.

Zhang et al., "Adsorption Characteristics of Strontium on Synthesized Antimony Silicate", Chemical Engineering Journal 277, 2015, Netherland, pp. 378-387.

Pichestapong et al., "Separation of Yttrium-90 from Strontium-90 by Extraction Chromatography Using Combined Sr Resin and RE Resin", Energy Procedia, Elsevier, vol. 89, Jun. 17, 2016, Netherlands, pp. 366-372.

Shapovalov et al., "Extraction-Chromatographic Isolation of 90Y for Medical Purposes", Radiochemistry vol. 54, No. 4, Aug. 24, 2012, United States, pp. 388-390.

Vyas et al., "Separation of 90Y from 90Sr using sequential multiple column extraction chromatography", Journal of Radioanalytical and Nuclear Chemistry, vol. 300, No. 1, Jan. 31, 2014, Netherlands, pp. 445-450.

Distribution coefficient ($K_d$) values determined using $^{88}$Zr (○), $^{88}$Y (□), and $^{55}$Fe (◇) tracers on Ln Resin across a range of HCl concentrations. The curve $y = 37.92x^{-2.45}$ ($R^2 = 0.935$) approximates the $^{88}$Y data

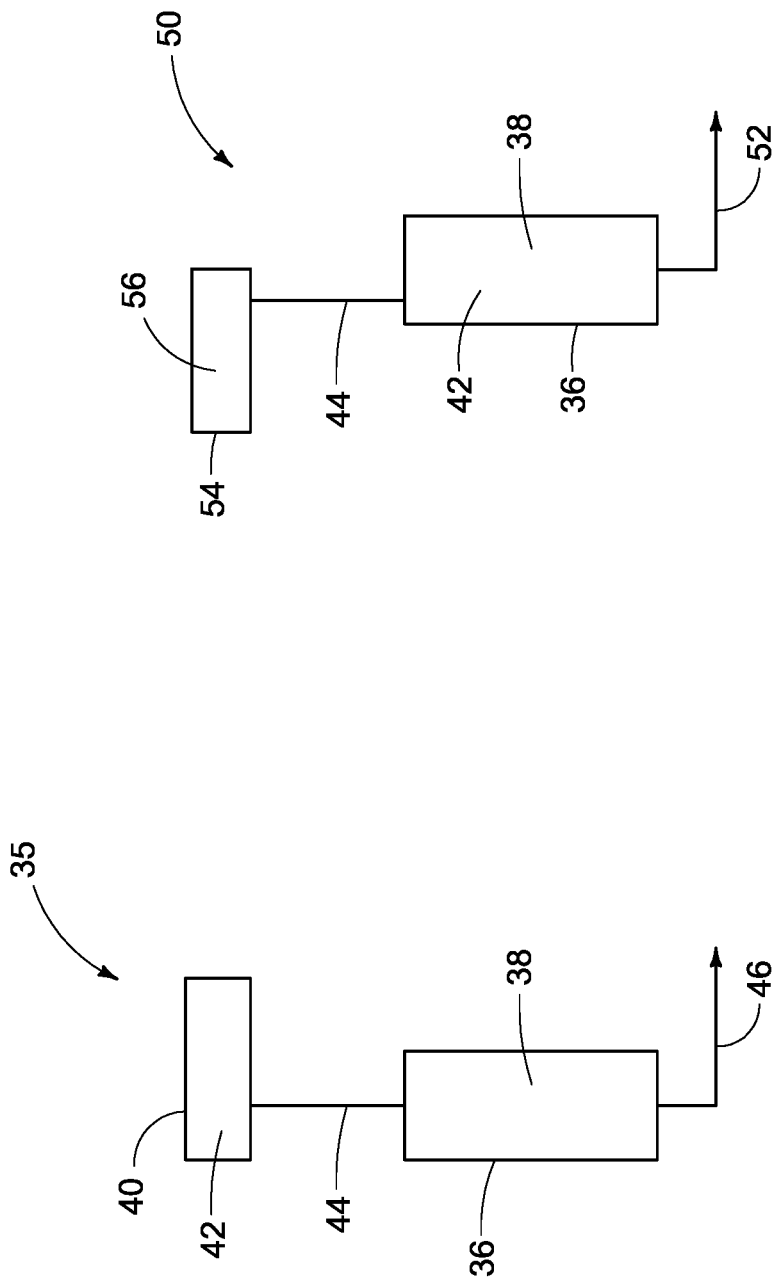

Gross LSA pulse height spectra of Col. 1 load effluent (2 μL aliquot) as a function of elapsed days. The initial spectrum, obtained 0.02 d after the $^{90}$Y/Sr separation, shows virtually no $^{90}$Y present in the sample. At 47 d, $^{90}$Sr / $^{90}$Y has virtually regained secular equilibrium.

Decay of ⁹⁰Y product from Run 1 between 0 and 60 days.

Decay of $^{90}$Y product from Run 2 between 0 and 60 days.

Decay of $^{90}Y$ product from Run 3 between 0 and 60 days.

Decay of $^{90}$Y product from Run 5 between 0 and 60 days.

Primary $^{90}$Y product activity, as obtained by LSA. Activity in the fractions continues to diminish with elapsed time. Error bars represent ±2s of the LSA-determined sample activity; MDA ≈ 0.03 Bq.

Calculated $^{90}$Sr decontamination factors for each purification run. These factors will continue to rise until $^{90}$Sr/$^{90}$Y reach secular equilibrium. Error bars are a propagation of the uncertainty in the injected $^{90}$Sr activity (±1s) and the uncertainty in the LSA-determined sample activity (±2s).

SYSTEMS AND METHODS FOR SEPARATING YTTRIUM AND STRONTIUM

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

The present disclosure relates to the separation of yttrium and strontium, and in particular embodiments, the present disclosure relates to the separation of yttrium and strontium isotopes and/or the preparation of concentrated forms of yttrium isotopes.

BACKGROUND

Yttrium isotopes typically can be fission products along with strontium isotopes and exist in the same solution as strontium isotopes. These fission products are generated by fissioning of actinides. Sr cyclotron targets can produce other isotopes by (p, n) reactions. The present disclosure provides systems and methods for separting yttrium from strontium, isolating yttrium isotopes from a solution of strontium and yttrium isotopes, and/or the preparation of concentrated forms of yttrium isotopes.

SUMMARY OF THE DISCLOSURE

Methods are provided for separating yttrium(Y) and strontium(Sr). The methods can include providing a dilute acidic mixture that includes Y and Sr to a vessel having a media therein. The methods can further include while providing the dilute acidic mixture, retaining at least some of Y from the dilute acidic mixture within the first vessel while at least eluting some of the Sr from the dilute acidic mixture to form a dilute acidic eluent.

Additional methods for separating Y and Sr are provided that can include providing a vessel containing a media and a dilute acidic mixture comprising Y. The methods can include providing a concentrated acid mixture to the vessel and while providing a concentrated acid mixture to the vessel recovering a concentrated acid eluent comprising at least some of the Y from within the vessel.

Additional methods for separating Y and Sr are also provided that can include providing a concentrated acidic mixture comprising Y to a vessel having a media therein and while providing that concentrated acidic mixture retaining at least some of the Y from the concentrated acidic mixture within the vessel and forming an eluent.

Further methods are also provided that can include methods for separating Y and Sr. The methods can include providing a vessel containing a media and a concentrated acid mixture that includes Y. The methods can include providing a dilute acid mixture to within the vessel and while providing a dilute acidic mixture to within the vessel recovering a dilute acid eluent that includes at least some of the Y from within the vessel.

Additional methods for separating Y and Sr are also provided that can include providing a first mixture comprising Y and Sr to a first vessel having a first media therein. The methods can include retaining at least some of the Y from the first mixture within the first vessel and providing a second mixture to the first vessel. The methods can further include recovering a first eluent comprising at least some of the Y from within the first vessel and providing the first elute that includes Y to a second vessel having a second media therein. The methods can also include retaining at least some of the Y from the first eluent within the second vessel and providing a third mixture to the second vessel. The method can also include recovering a second eluent that includes at least some of the Y from within the first vessel.

Methods for separating Y and Sr can also include providing a first mixture of at least two components to a first vessel having a first media therein with the first vessel defining a first volume. The method can include retaining at least some of one of the two components within the first vessel and eluting the one of the two components from the first vessel to a second vessel having a second media therein. The second vessel can define a second volume and the first volume can be greater than the second volume. The first media can be different from the second media. The methods can include retaining at least some of the one of the two components within the second vessel and eluting the one of the two components from the second vessel. Additionally, the elution from the first vessel can have a first concentration of the one component and with the elution from the second vessel can have a second concentration of the one component. The second concentration can be greater than the first concentration.

DRAWINGS

Figure 3:
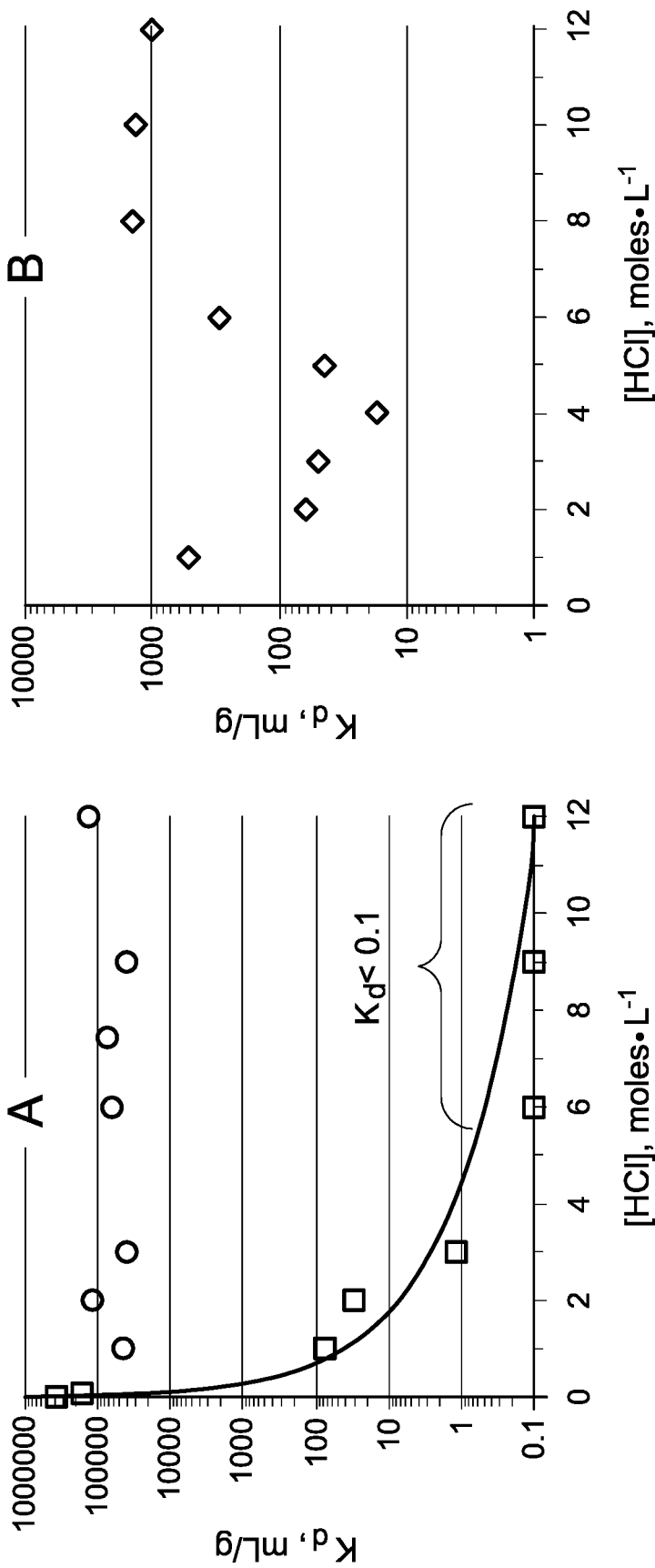

FIG. 3. is distribution coefficient data in accordance with embodiments of the present disclosure.

FIG. 4 is a system for practicing methods according to an embodiment of the disclosure.

FIG. 5 is a system for practicing methods according to an embodiment of the disclosure.

Figure 6:
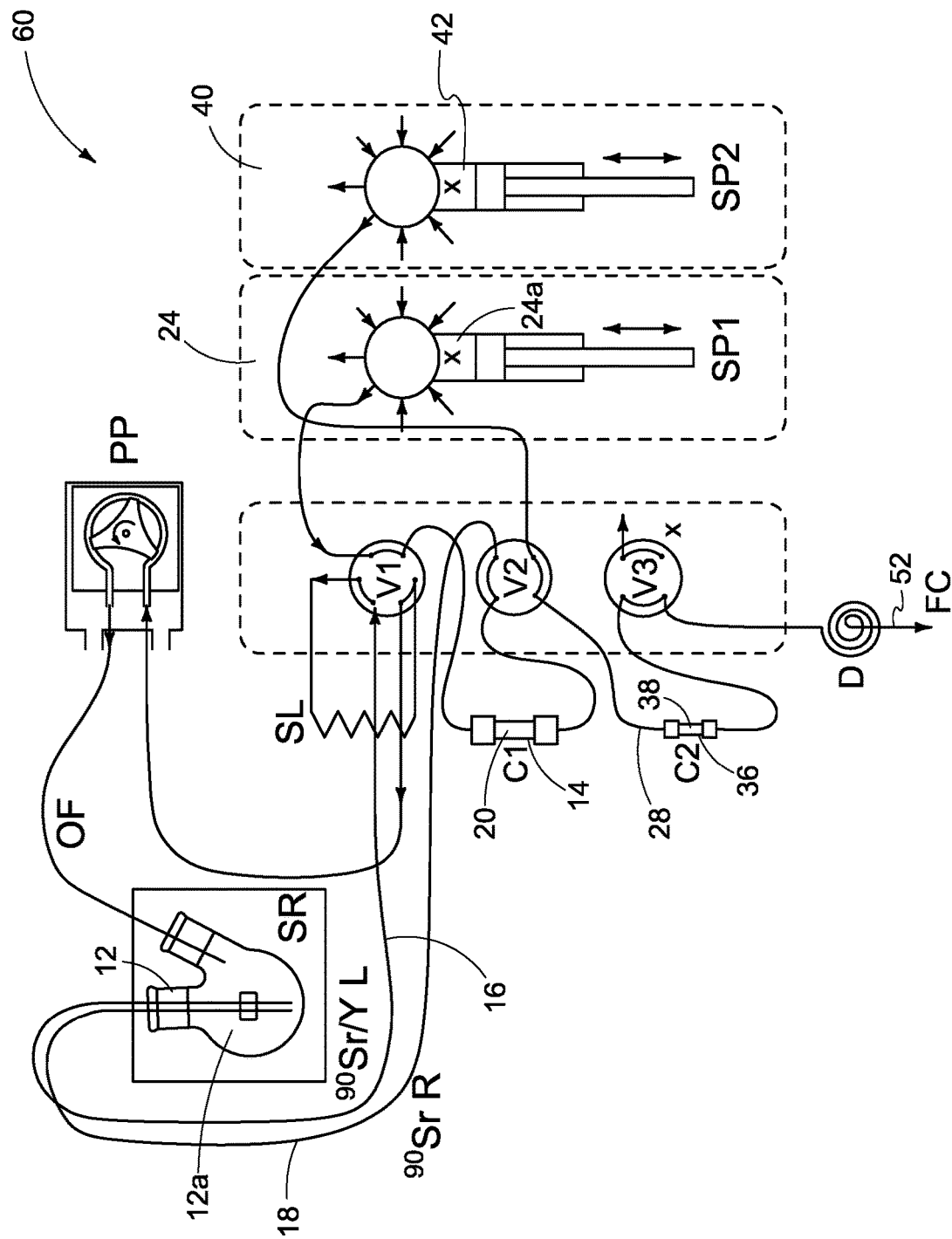

FIG. 6 is a system for practicing methods according to an embodiment of the disclosure.

Figure 7:
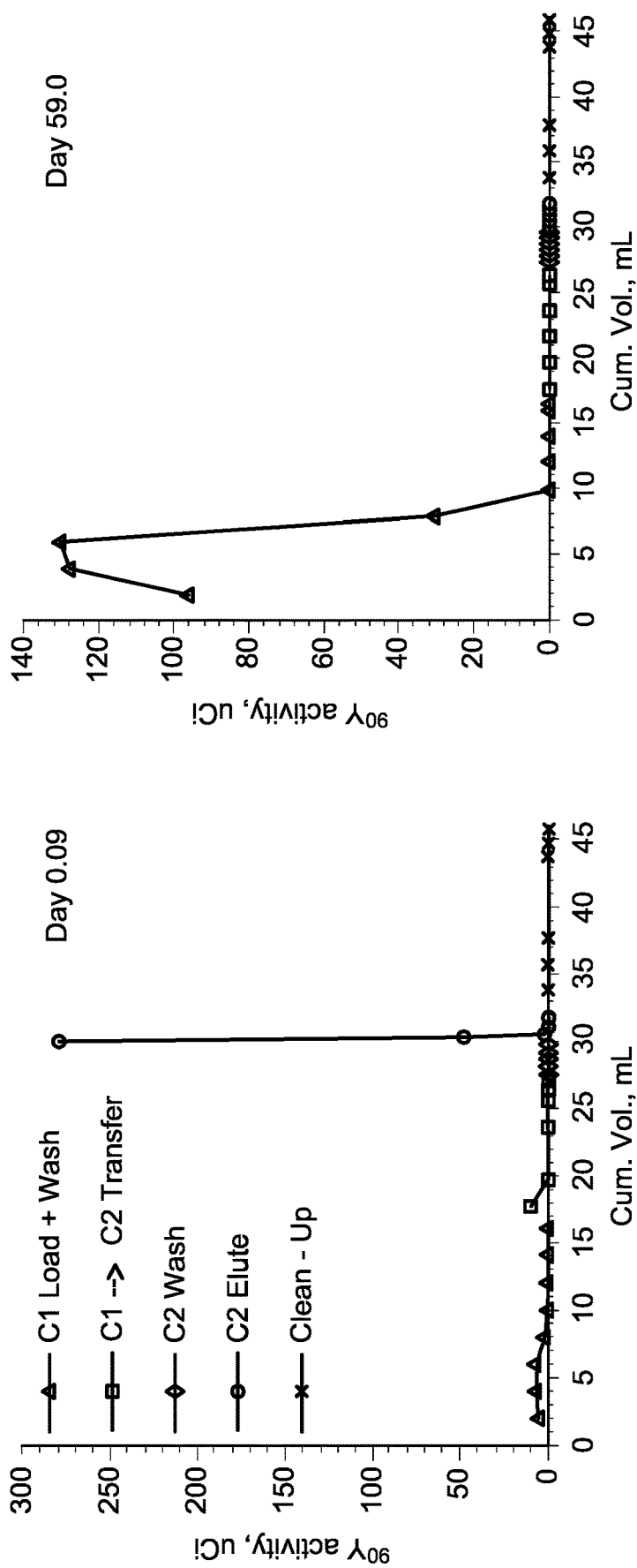

FIG. 7 is data acquired utilizing systems and methods according to an embodiment of the disclosure.

Figure 8:
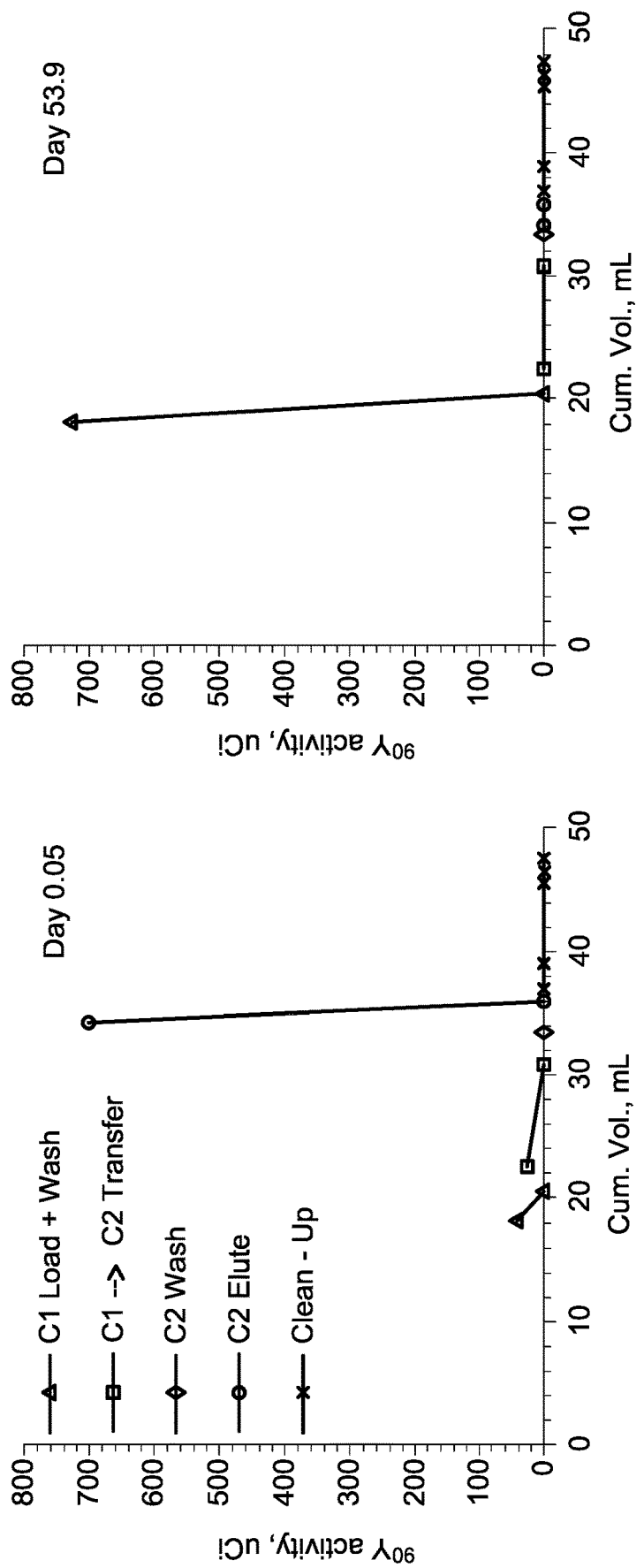

FIG. 8 is data acquired utilizing systems and methods according to an embodiment of the disclosure.

Figure 9:
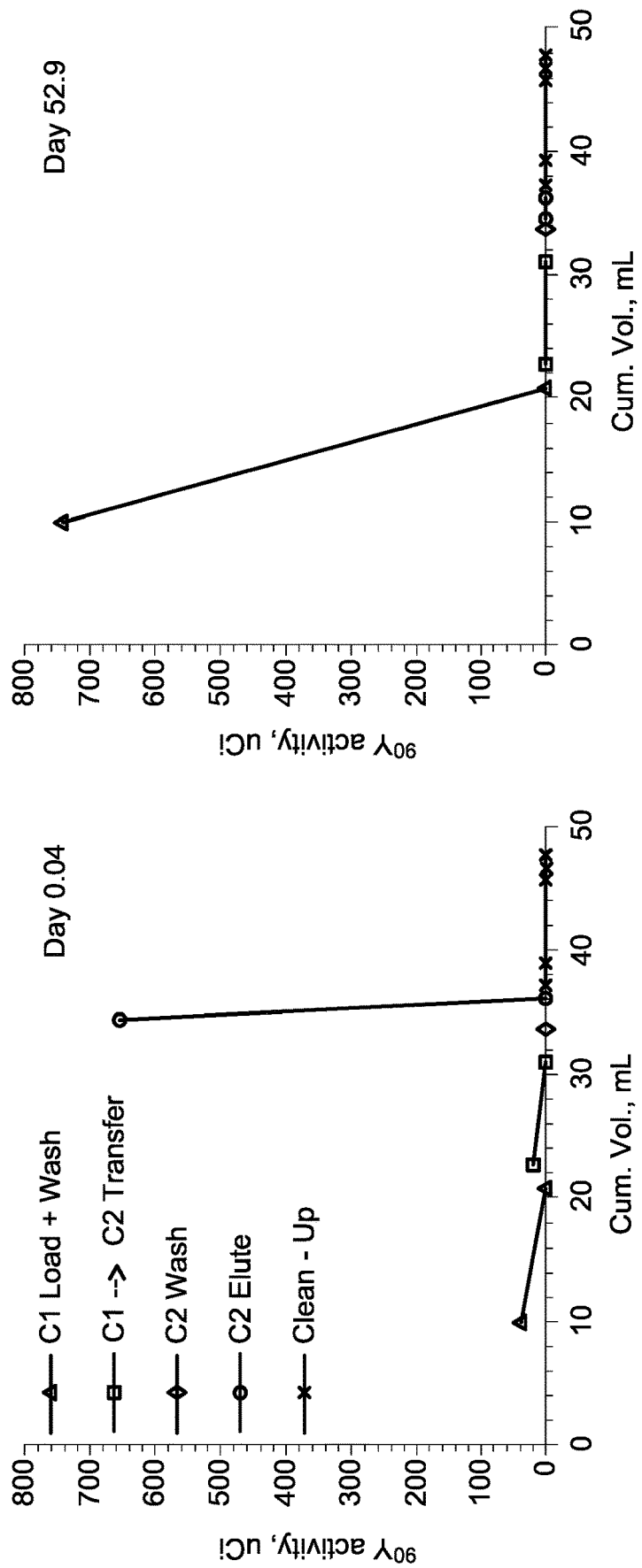

FIG. 9 is data acquired utilizing systems and methods according to an embodiment of the disclosure.

Figure 10:
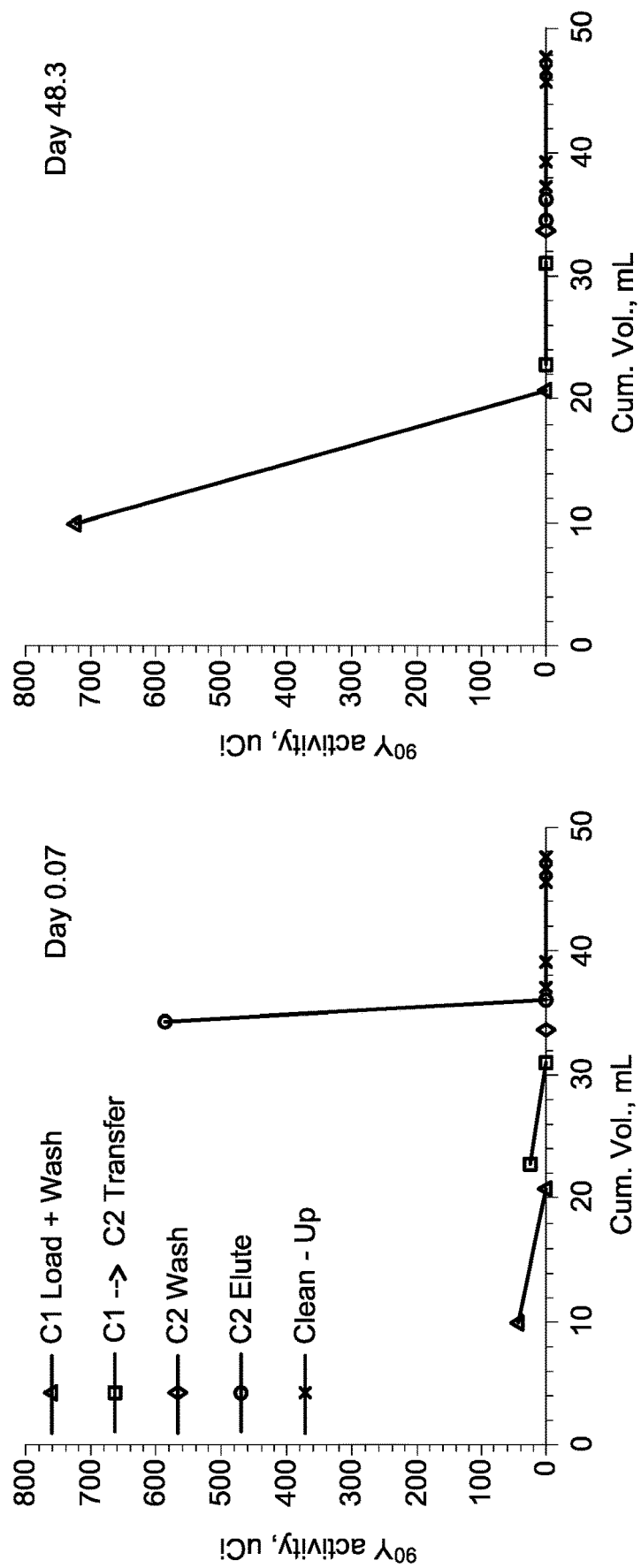

FIG. 10 is data acquired utilizing systems and methods according to an embodiment of the disclosure.

Figure 11:
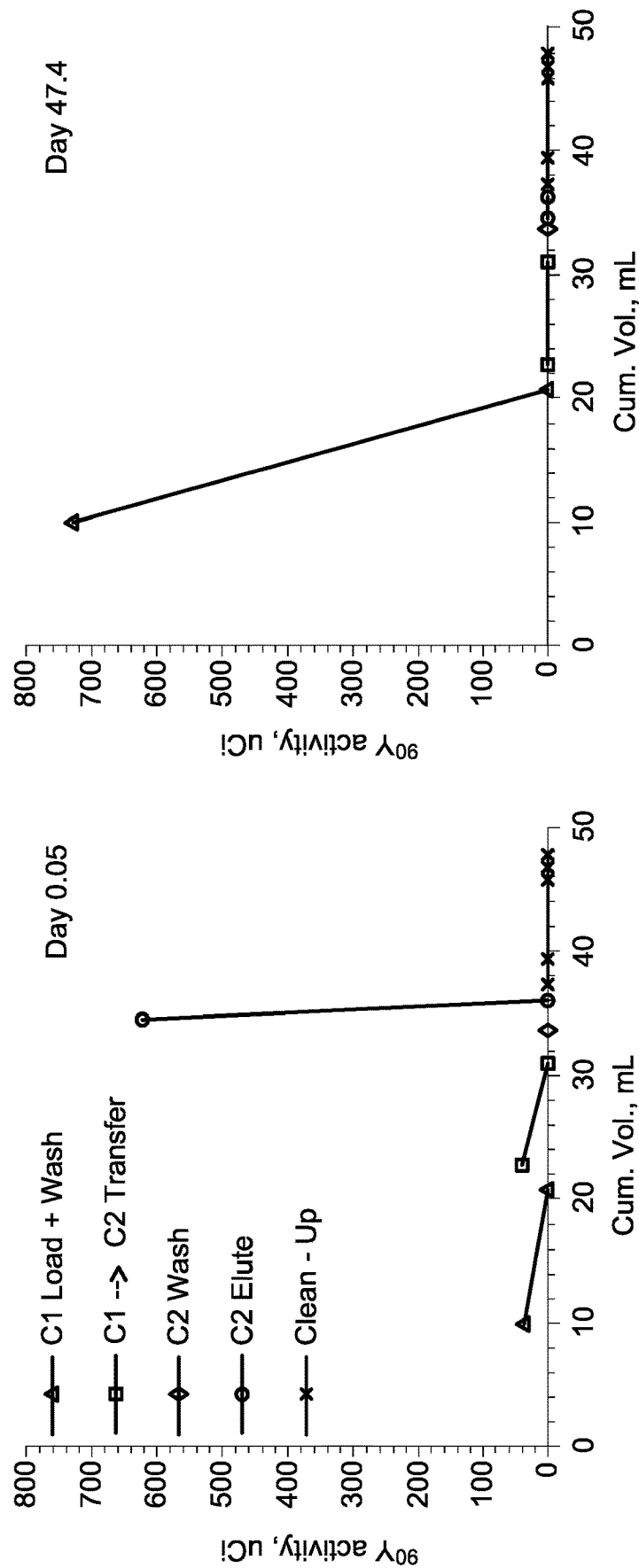

FIG. 11 is data acquired utilizing systems and methods according to an embodiment of the disclosure.

Figure 12:
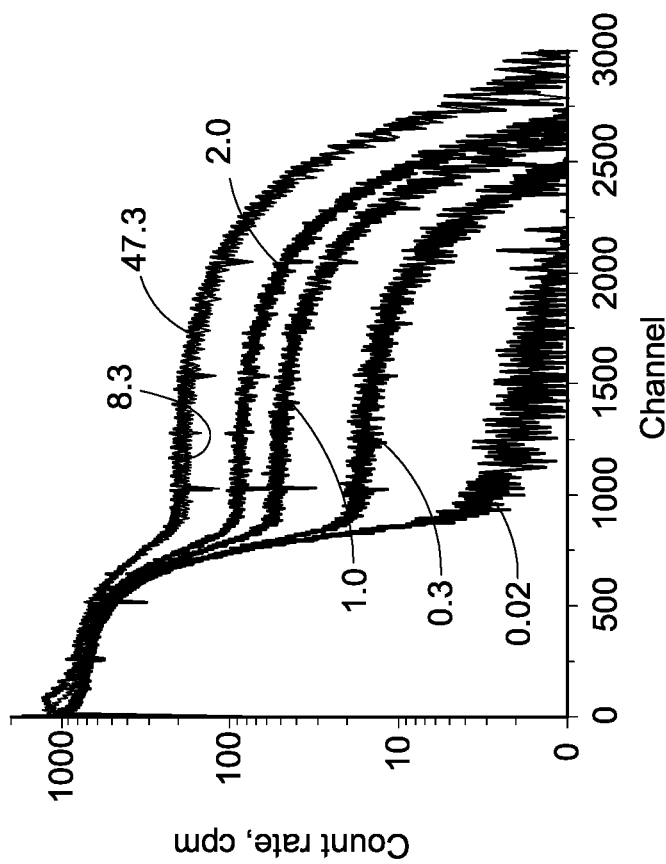

FIG. 12 is data acquired utilizing systems and methods according to an embodiment of the disclosure.

Figure 13:
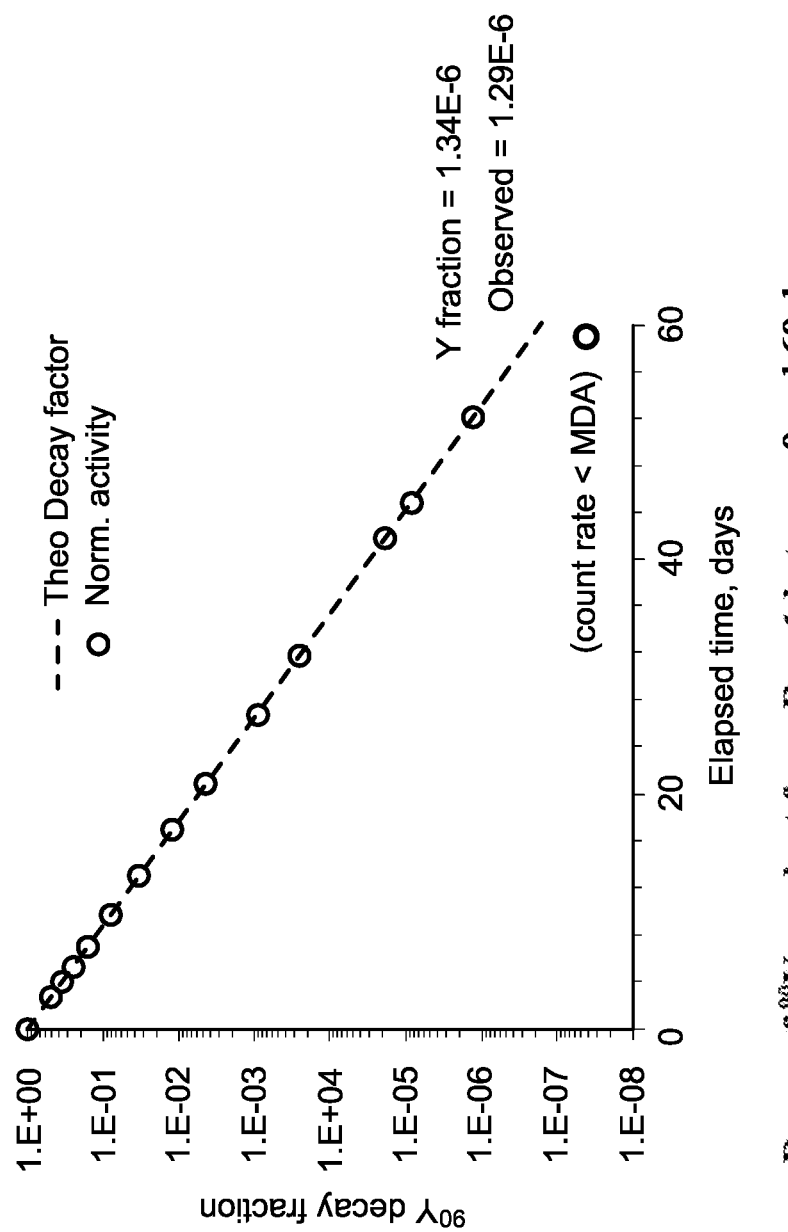

FIG. 13 is data acquired utilizing systems and methods according to an embodiment of the disclosure.

Figure 14:
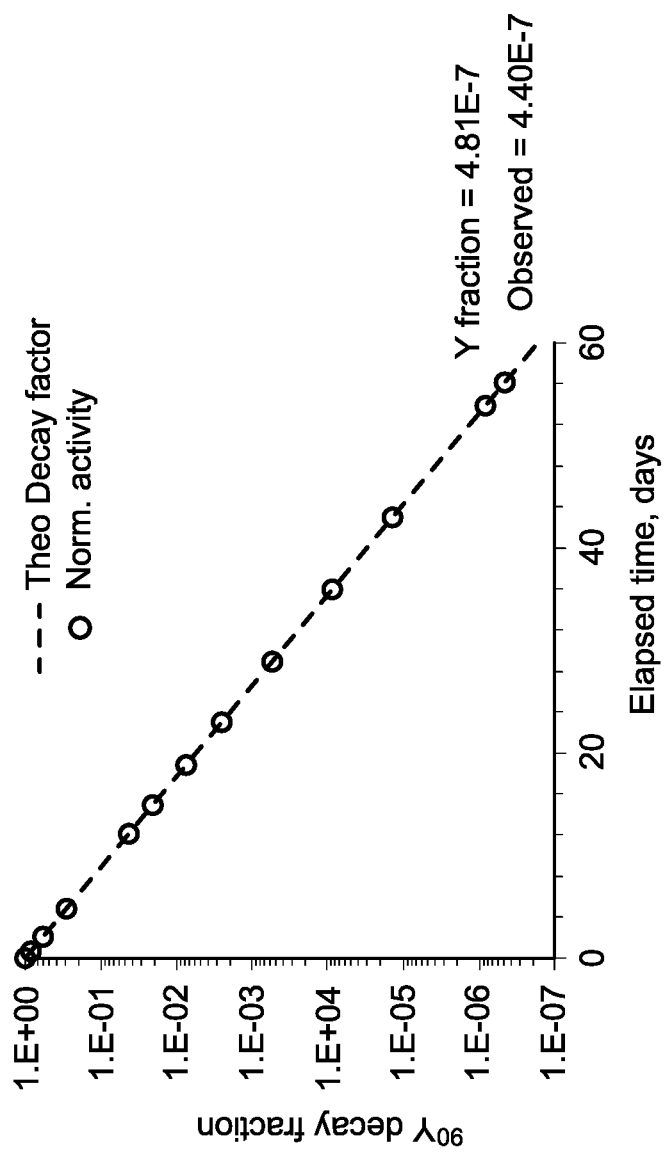

FIG. 14 is data acquired utilizing systems and methods according to an embodiment of the disclosure.

Figure 15:
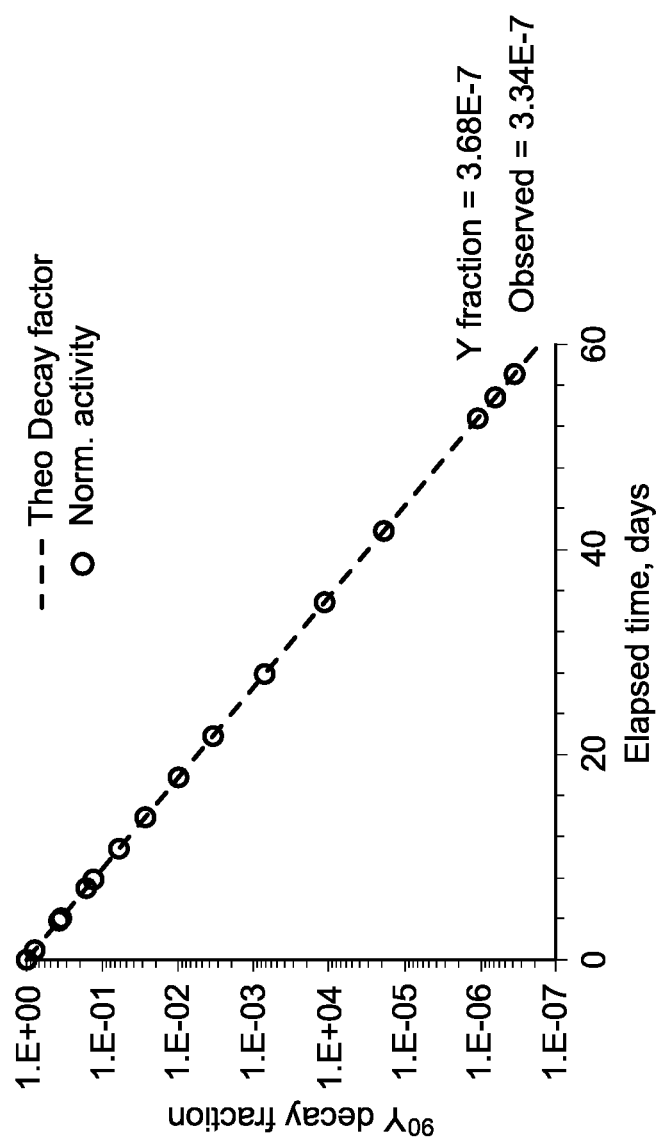

FIG. 15 is data acquired utilizing systems and methods according to an embodiment of the disclosure.

Figure 16:
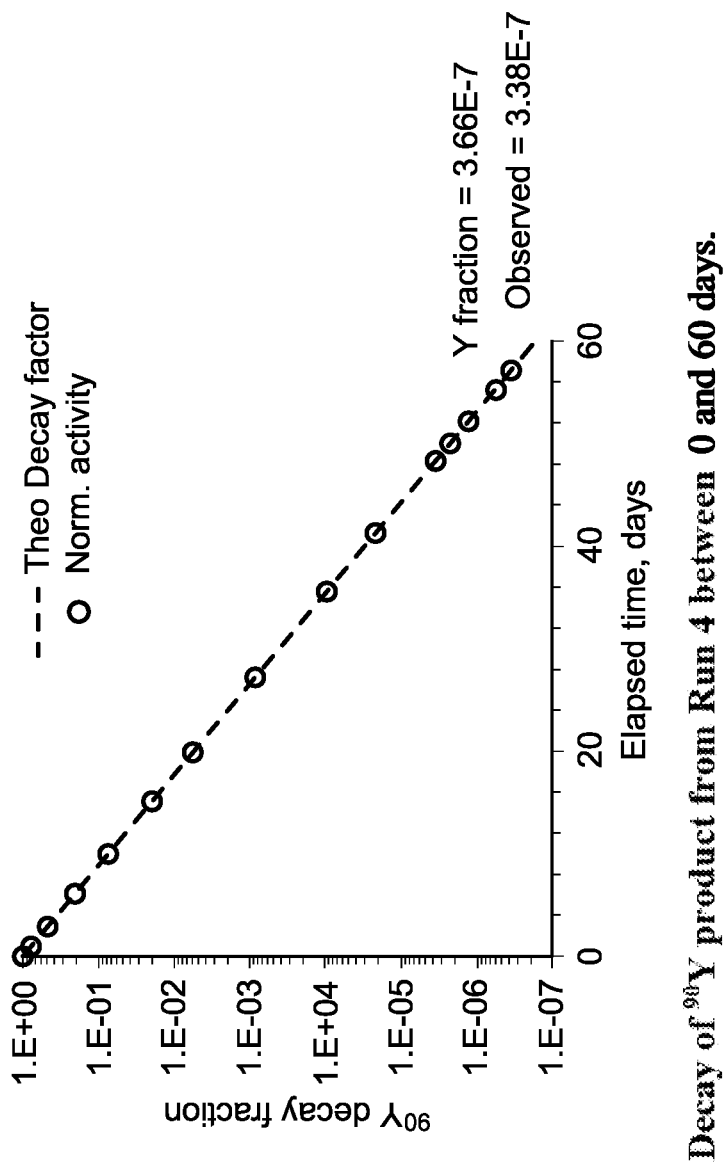

FIG. 16 is data acquired utilizing systems and methods according to an embodiment of the disclosure.

Figure 17:
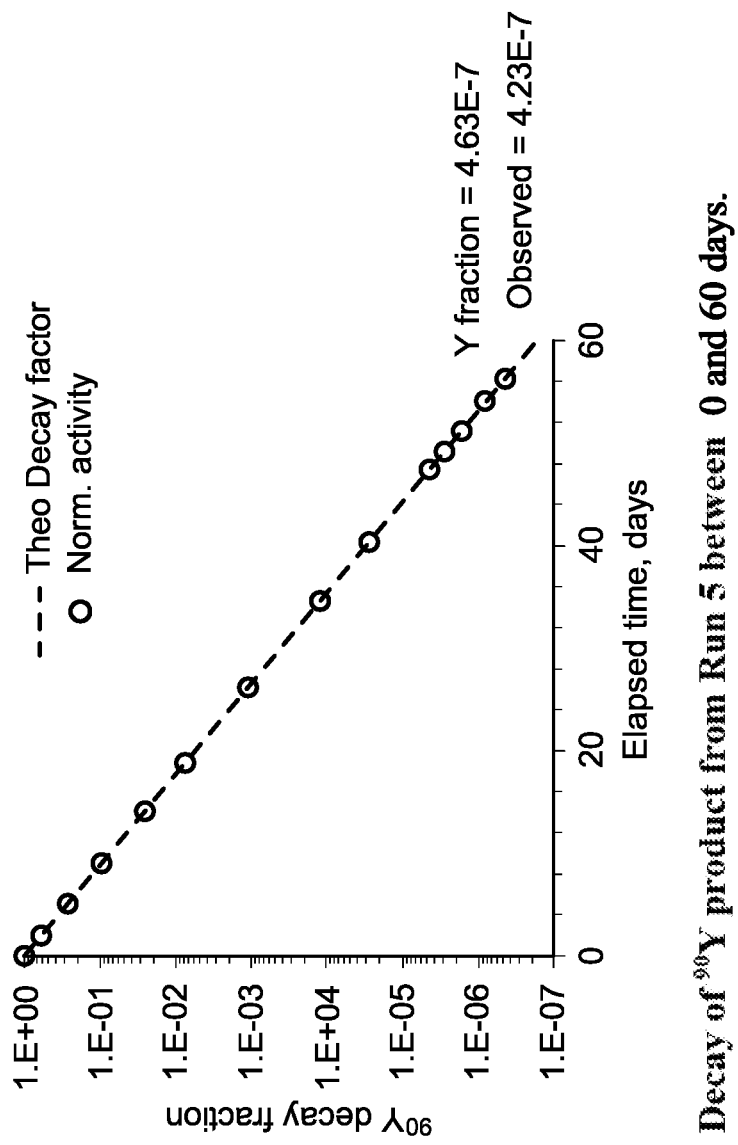

FIG. 17 is data acquired utilizing systems and methods according to an embodiment of the disclosure.

Figure 18:
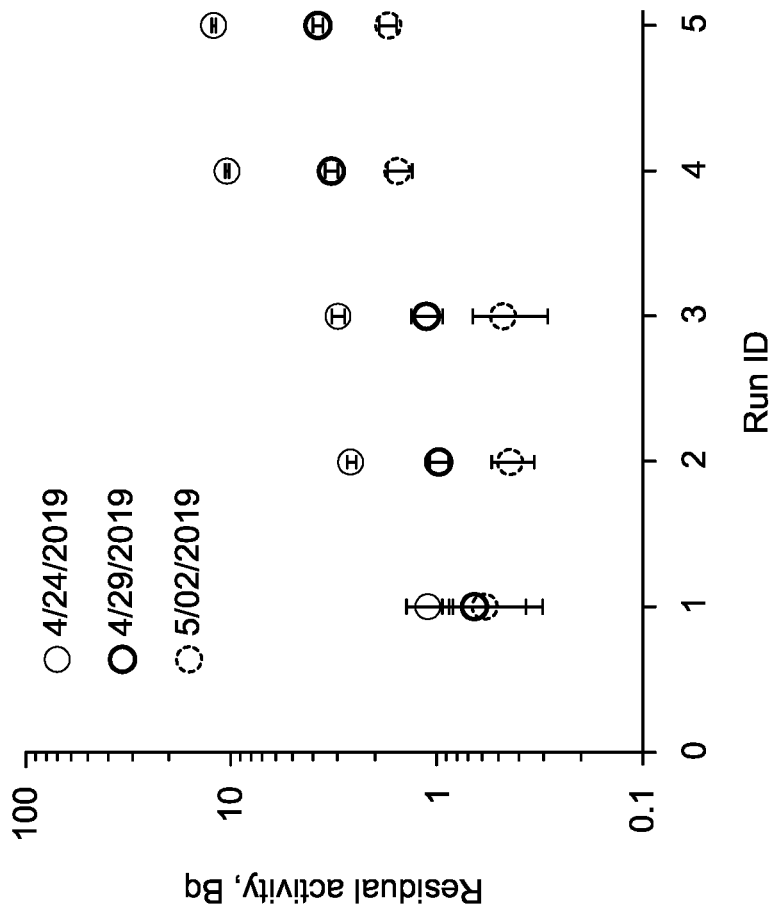

FIG. 18 is data acquired utilizing systems and methods according to an embodiment of the disclosure.

Figure 19:
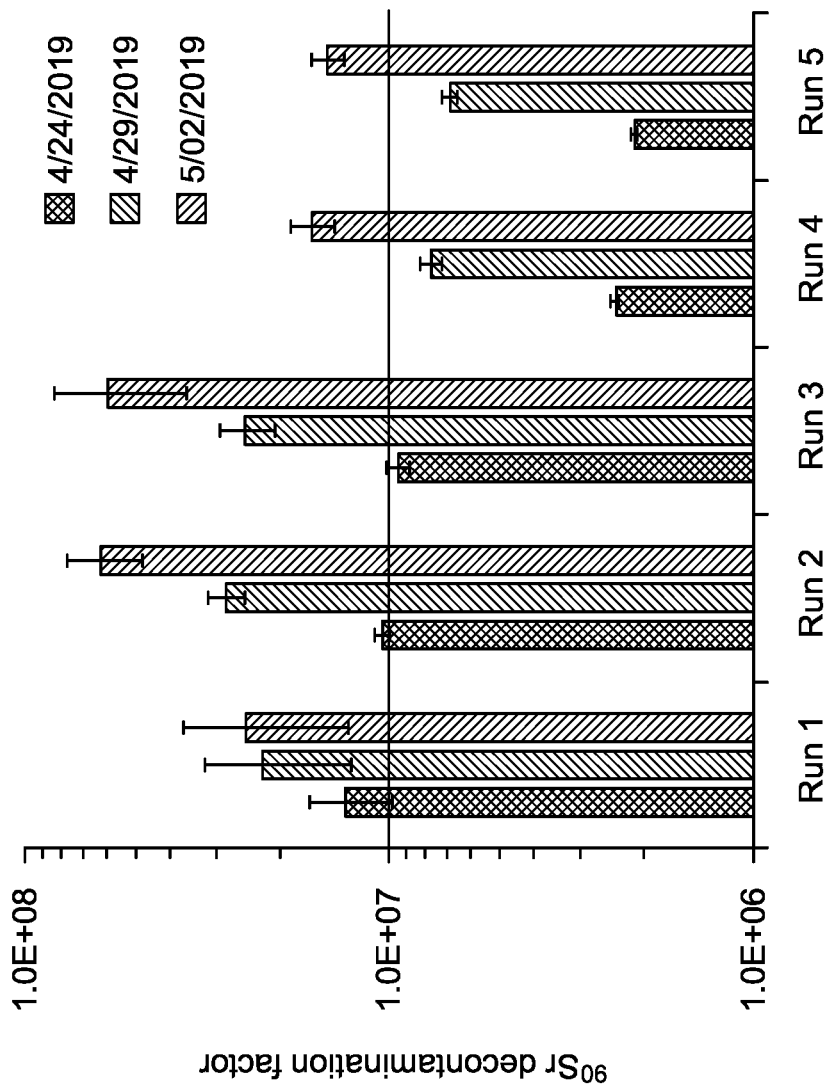

FIG. 19 is data acquired utilizing systems and methods according to an embodiment of the disclosure.

DESCRIPTION

Figure 1:
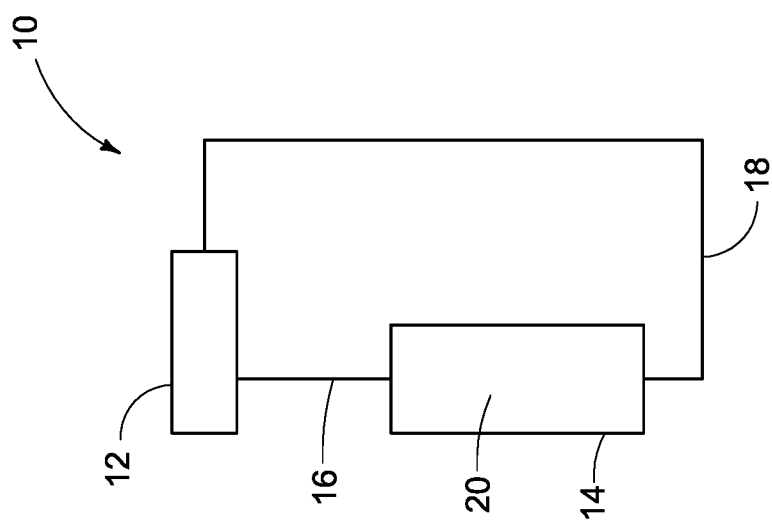
FIG. 1 is system for practicing methods according to an embodiment of the disclosure.

The systems and methods of the present disclosure will be described with reference to FIGS. 1-19. Referring first to FIG. 1 a system 10 is disclosed that includes at least two vessels 12 and 14 that can be in fluid communication via conduit 16 as well as another conduit 18. As for all vessels and conduits described in this description they can likewise be referred to as containers or holders or really any form of apparatus that can retain liquid or solid particles, and/or mixtures thereof within a confined or predefined space. Conduits 16 and 18 are represented as continuous here but throughout the specifications should be recognized that they can be valve operable to be opened or closed as desired to provide or not provide fluid communication between one vessel and another. The conduits can also be configured to provide the solution that is being exchanged or provided through them. Therefore, by example, the conduits can be resistant to acid or organic acids or resistant to organics themselves as needed. In accordance with example implementations the methods for separating Y and Sr can include providing a dilute acidic mixture including Y and Sr. This dilute acidic mixture of Y and Sr can be in vessel 12 for example and this dilute acidic mixture can include nuclides of Y(for example $^{90}Y$, $^{89}Y$, $^{88}Y$, or $^{86}Y$) as well as nuclides of Sr(for example $^{90}Sr$, $^{89}Sr$, $^{88}Sr$ or $^{86}Sr$). This dilute acidic mixture can be sourced from Sr-bearing nuclear material stockpiles which can be a biproduct of nuclear processing. For example, $^{86}Y$ is a 14.7 hr half-life isotope produced by the (p, n) reaction onto an isotopically enriched $^{86}Sr$ target. In the case of $^{86}Y/^{86}Sr$, it can be a result of proton bombardment onto a $^{86}Sr$ cyclotron target.

General recipes for the preparation of solutions that can simulate Sr-bearing stockpile materials are provided in Table 1.

TABLE 1

General recipe to prepare a $^{90}Sr$-bearing simulant solution containing Group II elements and Y that approximate those found in an example $^{90}Sr$ product solution.

| Element spike | Spike conc., mg/mLb | Desired conc., μg/mL | Spike vol., μL | $^{90}Sr$ simulant sol'n. components |
|---|---|---|---|---|
| Ca | 99.26 | 540 | 33.0 | |
| Sr | 260.21 | 50,250 | 1770 | |
| Ba | 8.55 | 20 | 14.2 | |
| Y | 3.42 | 2.30 | 4.1 | |
| Total element spike vol. = | | | | 1.22 |
| $^{90}Sr$ spike vol. = | | | | 0 c |
| 0.1M HCl diluent vol. = | | | | 4.84 |
| Total vol. = | | | | 6.06 |

Spiked solutions can also be prepared with reference to Table 2 below as well.

TABLE 2

$^{90}Sr$ activities that were spiked into each column load solution prior to $^{90}Y$ purification.

| Run | Run date | Determined $^{90}Sr$ activity μCi a,b |
|---|---|---|
| 1 | Feb. 15, 2019 | 3.96E+2 (2.12E+0) |
| 2 | Feb. 20, 2019 | 7.41E+2 (2.12E+0) |
| 3 | Feb. 21, 2019 | 7.66E+2 (1.56E+0) |
| 4 | Feb. 21, 2019 | 6.82E+2 (8.85E-1) |
| 5 | Feb. 27, 2019 | 7.02E+2 (5.05E-1) |

In accordance with example implementations acidic reagents can be utilized such as solutions of dilute acidic mixtures and concentrated acidic mixtures prepared with the reagents disclosed below for example.

Concentrated hydrochloric acid (HCl) can be ACS Certified grade or higher (Fisher Scientific, Waltham, MA). Dilutions of HCl can be prepared from deionized water (>18 MΩ.cm) using a Barnstead E-Pure water purification system (Dubuque, IA). Scintillation cocktail was UltimaGold AB (PerkinElmer, Billerica, MA).

A supply of ~5 mCi $^{90}Sr$ in ~2% $HNO_3$ can be obtained and this solution can be evaporated to nitrate salt, then transformed to formate salt. The $^{90}Sr$ residue can be evaporated and transformed to chloride salt prior to use. An infrared lamp can be used to evaporate metered volumes of the transformed $^{90}Sr$ stock solution to Teflon vials (7 mL round-bottom vial, Savillex, Eden Prairie, MN).

Single element solutions containing concentrates of Ca(II), Sr(II), Ba(II), and Y(III) in 0.1 M HCl can be prepared, as briefly described below:

Ca solution can be prepared by dissolving calcium metal chips in concentrated. HCl. After evaporation of excess acid, the ($CaCl_2$) salts can be brought up in 0.1 M HCl. Prepared Ca(II) conc.=99.26 mg/mL.

Sr solution can be prepared from strontium(II) carbonate salt. The salt can be saturated with conc. HCl to destroy carbonate and convert the salts to strontium chloride. The excess acid can be evaporated off overnight, and then the dried salts were brought up in 0.1 M HCl. Prepared Sr(II) conc.=260.21 mg/mL.

Ba solution can be prepared from barium (II) chloride salt. The salt can be dissolved directly in 0.1 M HCl. Prepared Ba(II) conc.=8.55 mg/mL.

Y solution can be prepared from yttrium(III) chloride salt. The salt can be dissolved directly in 0.1 M HCl. Prepared Y(III) conc.=3.42 mg/mL.

Aliquots of these solutions can be added to $^{90}Sr$-spiked solutions in order to simulate the dissolved solids present in $^{90}Sr$ stocks.

In accordance with example implementations, and with reference to FIG. 1, this dilute acidic mixture can include Y and Sr can be provided to vessel 14 having a first media 20 therein. The dilute acidic mixture can have a pH less than 7 and the dilute acidic mixture can also have a pH less than 3. The dilute acidic mixture can have a concentration of acid that is less than 0.1M, for example, but must include sufficient acid to remain acidic. As described herein the dilute acidic mixture can additionally include elemental Sr, Ca and/or Ba and the dilute acid mixture can include stockpiled Sr-bearing nuclear material for example.

Within vessel 14 can be a first media 20 that includes a resin. This resin can include Bis(2-ethylhexyl) hydrogen phosphate (HDEHP). The first media can also include alkylphosphorus extractants. Alternatively, the first media can also include Si. In accordance with example implementations the media 20 can be considered a first media.

The Y purification method can employ two columns or vessels in tandem. First vessel 14 can have media 20 that includes a Di-(2-ethylhexyl)phosphoric acid (HDEHP)-based extraction chromatography resin, sold under the trade name Ln Resin (Eichrom Technologies, Ltd, Lisle, IL). The particle size distribution used was 100-150 μm, but other size distributions such as 50-100 μm or 20-50 μm are contemplated.

The Ln Resin can be packed into a column having a ~0.25 cc internal volume in a 1 cc SPE tube kit (Supelco) that can be cut to the appropriate dimension. The columns can be polypropylene, with 20 μm pore size polyethylene frits. The column can be fitted with a custom-made plastic cap (with female luer fitting) that can be inserted into the top of the trimmed column.

In accordance with example implementations, while providing the dilute acid mixture comprising Y and Sr the method can provide for retaining at least some of the Y from the dilute acidic mixture within vessel 14 while eluting some of the Sr from the dilute acidic mixture to form a dilute acidic eluent which would be provided to conduit 18. In accordance with example implementations the method can also include providing the dilute acidic mixture from reservoir 12 and then providing the dilute acidic eluent to reservoir 12 via conduit 18 for example.

In accordance with example implementations, the dilute acidic mixture can further comprise Zr and the method can also include while providing the dilute acidic mixture, retaining at least some of the Zr from the dilute acidic mixture within vessel 14. The method can also include further retaining at least some of the Fe from the dilute acidic mixture within vessel 14. The dilute acidic mixture can include HCl for example, an organic acid for example, such as formic acid for example.

Figure 2:
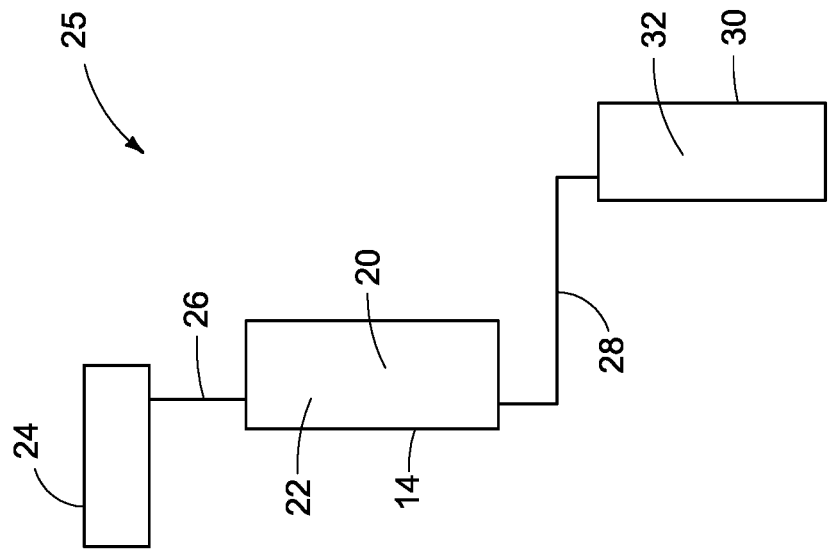
FIG. 2 is a system for practicing methods according to an embodiment of the disclosure.

Referring next to FIG. 2 a system 25 is depicted that can include a vessel 14 containing a media 20 and a dilute acidic mixture 22 that includes Y. In accordance with example implementations vessel 14 can be the vessel of system 10 after the providing of the Y/Sr mixture 12 to vessel 14 for example. In accordance with example implementations a concentrated acid mixture contained in vessel 24 can be provided via conduit 26 to vessel 14. While providing the concentrated acid mixture of vessel 24 to vessel 14 an acid eluent comprising at least some of the Y from within vessel 14 can be recovered in vessel 30 as eluent 32 via conduit 28.

In accordance with example implementations, vessel 14 can include one or both of Zr and Fe and while providing the concentrated acid mixture from vessel 24 to vessel 14 at least some or both of the Zr and Fe can be retained. In accordance with example implementations this concentrated acid mixture can include HCl, an organic acid, such as formic acid for example. In further embodiments the method can provide the concentrated acid eluent of 32 from within vessel 30 to another vessel containing another medium. This additional embodiment will be described with more detail herein. Additionally the media 20 remains as the media 20 as described in system 10 for example.

In accordance with an example embodiment, tandem column-based $^{90}$Y purification methods are contemplated and described herein. Referring to FIG. 3, the affinity for Y on Ln Resin drops approximately as a negative power function with increasing HCl concentration. At 0.1 M HCl, the distribution coefficient ($K_d$) for Y exceeds 105 mL/g; by the time HCl concentration has increased to 8 M HCl, Y $K_d$ drops by ~6 orders of magnitude. This substantial change in Y affinity between the two HCl concentrations can dictate what is considered a dilute acidic or concentrated acidic mixture. In accordance with example implementations and with respect to the systems and methods of the present disclosure, a dilute acidic mixture, for example, can be an acid mixture that provides for a $K_d$ of at least 10, while a concentrated acidic mixture, for example, can provide for a $K_d$ of less than 10; each of which with regard to Y on a HDEHP resin such as Ln Resin.

Further, with reference to FIG. 3, Zirconium-90 is a contaminant of concern in aged $^{90}$Sr-bearing stockpiles, as it is the stable decay product of $^{90}$Y. Therefore, it accumulates in the $^{90}$Sr stocks over time. The data in FIG. 3 demonstrates that Zr(IV) affinity for Ln Resin is >104 mL/g across the entire range of HCl concentration. Therefore, a primary Ln Resin column is capable of $^{90}$Zr removal during the $^{90}$Y load step. Furthermore, $^{90}$Zr is retained on the column while $^{90}$Y is eluted and may pass to column 2 (see Table 3).

FIG. 3 also provides a $K_d$ map for Fe(III) on the first media such as Ln Resin. During the column 1 load step (0.1 M HCl), Fe may have a $K_d$ of ~$10^3$ mL/g. Accordingly, most, if not all, of this contaminant can be retained on column 1 during the $^{90}$Y load/wash (i.e., the Y/Sr dilute acid mixture is provided to the first vessel). Additionally, Fe can have a $K_d$ of ~1300 mL/g at 8 M HCl. Accordingly, Fe can be retained on the column during the $^{90}$Y transfer step (see Table 3 below, and in accordance with system 25).

TABLE 3

Example behavior of Y(III) and Sr(II) through the tandem column process. While not exclusively evaluated during the present study, the behavior of Fe(III) and Zr(VI) are also shown.

| | | Active | Conc. HCl, | Retained (↑) or unretained (↓) | | | |
|---|---|---|---|---|---|---|---|
| Step | Description | column | moles/L | Y(III) | Sr(II) | Zr(IV) | Fe(III) |
| 3 | $^{90}$Y load/wash | C1 | 0.1 | ↑ | ↓ | ↑ | ↑ |
| 4 | $^{90}$Y transfer | C1 → C2 | 8 | ↓ → ↑ | ↓ → ↓ | ↑ → ↑ | ↑ → ↑ |
| 5 | Wash | C2 | 8 | ↑ | ↓ | ↑ | ↑ |
| 6 | $^{90}$Y elute | C2 | 0.1 | ↓ | ↓ | ↓ | ↓ |

Referring next to FIG. 4 system 35 is provided that includes a vessel 36 having a media 38 therein in fluid communication via conduit 44 to vessel 40 having a mixture 42 therein and operatively coupled to another conduit 46 for retrieving any eluent from vessel 36. In accordance with example implementations methods are provided for separating Y and Sr that can include providing a concentrated acid mixture 42 with this acid mixture comprising Y to vessel 36 having media 38 therein. This concentrated acid mixture can be provided from the methods and systems of FIG. 2 as described herein and vessel 36 can be aligned with system 25 for example to receive an acidic eluent therefrom.

In accordance with example implementations media 38 can include a resin such as diglycolimide resin, for example (diglycolamide)-based extraction chromatography resin, sold under the trade name DGA-Normal Resin (Eichrom Technologies, Ltd.). The particle size distribution used can be 20-50 µm, 50-100 µm, and/or 100-150 µm Example extraction media can include N,N,N',N'-tetra-n-octyldiglycolamide.

The concentrated acid mixture can include at least some of the Sr for example as radioactive and stable isotopes of Sr such as $^{90}$Sr, $^{89}$Sr, $^{88}$Sr, or $^{86}$Sr. The method can include while providing the concentrated acid mixture retaining at least some of the Y from the concentrated acid mixture within vessel 36 and forming an eluent that can include at least some of the Sr in conduit 46. At least some of the concentrated acid mixture can include Zr and the method can include, while providing the concentrated acid mixture to vessel 36, retaining at least some of the Zr from the concentrated acid mixture. Additionally or separately, at least some of the concentrated acid mixture can include Fe and the method can include, while providing in the concentrated acid mixture, retaining at least some of the Fe from the concentrated acid mixture within vessel 36.

Referring next to FIG. 5 system 50 is provided that can include vessel 36 having media 38 therein as well as a concentrated acid mixture 42 that includes Y. In accordance with example implementations vessel 54 can include a dilute acid mixture 56. This dilute acid mixture can be provided to within vessel 36. The method can provide for, while providing dilute acid mixture 56 to within vessel 36, recovering a dilute acid eluent in conduit 52 that can include at least some of the Y from within vessel 36. The media within vessel 36 can be as described with reference to FIG. 4 for example.

The vessel 36 can include at least some of the Y for example as radioactive and stable isotopes of Y such as of $^{90}$Y, $^{89}$Y, $^{88}$Y, or $^{86}$Y, for example. The vessel can also contain one or more of Zr or Fe and the method can further include for providing dilute acid mixture 56 to vessel 36 eluting at least some of one or both of Zr and/or Fe within vessel 36. As described herein the dilute acidic mixture can include HCl and the mixture can include an organic acid such as formic acid for example. Additionally while providing the dilute acid mixture to vessel 36, the method can include eluting at least some of the Sr within the vessel.

Referring next and with reference to FIG. 6 a system 60 is provided wherein vessels 14 and 36 are provided in tandem and embodiments of the systems of 10, 25, 35, and 50 described herein are utilized together to prepare an eluent 52 comprising Y. In accordance with example implementations and with reference to FIG. 6 a first mixture 12a comprising Y and Sr can be provided to a first vessel 14 having a first media 20 therein. This first mixture can be a dilute acidic solution and the first media can be an alkylphosporus extractant resin such as HDEHP resin. At least some of the Y from first mixture 12a can be retained within vessel 14 utilizing media 20 for example.

In accordance with example implementations a second mixture 24a can be provided to first vessel 14 and the method can further include recovering a first eluent 28 and providing first eluent 28 that includes Y to a second vessel 36 having a second media 38 therein. The second mixture can be a strong acidic or concentrated acidic solution such as HCl and the second media can be a diglycolamide resin such as N, N,N',N'-tetra-n-octyldiglycolamide. The method can further include retaining at least some of the Y from first eluent 28 within second vessel 36 utilizing media 38 for example and providing a third mixture 42 to second vessel 36 and, when providing third mixture 42, recovering a second eluent 52 that includes at least some of the Y from the first vessel. This third mixture can be a weak or dilute acid mixture such as HCl.

In accordance with other example implementations and with reference to FIG. 6 a first mixture 12a comprising Y and Sr can be provided to a first vessel 14 having a first media 20 therein. At least some of the Y from first mixture 12a can be retained within vessel 14 utilizing media 20 for example. In accordance with this embodiment the first mixture can be a strong acidic or concentrated acidic solution such as HCl and the first media can be diglycolamide resin such as N, N,N',N'-tetra-n-octyldiglycolamide.

Continuing with this embodiment, a second mixture 24a can be provided to first vessel 14 and the method can further include recovering a first eluent 28 and providing first eluent 28 that includes Y to a second vessel 36 having a second media 38 therein. This second mixture can be a dilute or weak acidic solution that can include HCl and the first media can be an alkylphosphorus extractant resin such as HDEHP resin.

The method can further include retaining at least some of the Y from first eluent 28 within second vessel 36 utilizing media 38 for example and providing a third mixture 42 to second vessel 36 and, when providing third mixture 42, recovering a second eluent 52 that includes at least some of the Y from the first vessel. This third mixture can be a strong or concentrated acid mixture such as HCl.

Additionally the method can provide that vessels 14 and 36 are of substantially different sizes with vessel 14 being at least as large but can be larger than vessel 36. In such a configuration, the Y recovered from the systems and methods of the process can be in a concentrated form and suitable for industrial use. Accordingly, the volume of vessel 14 can be larger than the volume of vessel 36.

Table 3 above also indicates the behavior of the four selected ions on the second media (DGA Resin) during the $^{90}$Y transfer, secondary wash, and $^{90}$Y elute steps.

An example system schematic 60 is shown in FIG. 6, and the labels are defined in Table 4 below. System 60 includes three pumps (PP, SP1, and SP2). These pumps are provided as one or more of many potential fluid delivery systems, that can also include gravity.

TABLE 4

Listing of schematic labels presented in FIG. 6.

| Label | ID | Label | ID |
|---|---|---|---|
| SP1-SP2 | Syringe pumps 1 & 2 | D | In-line $^{90}$Y product detector (optional) |
| V1 | 6-port, 2-pos valve | FC | Fraction collector |
| V2-V3 | 2-port, 2-pos. valves | SR | Sample reservoir |
| PP | Peristaltic pump | $^{90}$Sr/Y L | Load line for $^{90}$Sr/Y |
| C1 | Ln Resin column | $^{90}$Sr R | $^{90}$Sr return line |
| C2 | DGA column | OF | $^{90}$Sr/Y overflow line |
| SL | Sample injection loop | | |

System 60 can be programmed to perform the series of steps outlined in Table 5 below. Delivered reagent volumes and flow rates through the columns may be set, as described below.

The reagent volumes programmed to be delivered to system 60 can be a function of the fluid delivery systems displacement volume, for example wherein one (or two) syringe volumes were delivered for a particular step. The delivered volumes can be deliberately programmed to be excessive (i.e., many bed volumes of reagent delivered through the columns).

TABLE 5

Tandem column $^{90}$Y purification method steps as tested.

| Step | Description | Active column | Conc. HCl, moles/L | Delivered vol., mL [a] | Flow rate, mL/min [a] | Foot-notes |
|---|---|---|---|---|---|---|
| 1 | Condition C1 | C1 | 0.1 | 3 | 1-2 | |
| 2 | Condition C2 | C2 | 8 | 2 | 0.5-1 | |
| 3 | $^{90}$Y load/wash | C1 | 0.1 | 20 | 1-2 | b. |
| 4 | $^{90}$Y transfer | C1 → C2 | 8 | 10 | 0.5-1 | |
| 5 | Wash | C2 | 8 | 2.5 | 0.5-1 | |
| 6 | $^{90}$Y elute | C2 | 0.1 | 2.5 | 0.2-0.5 | c. |
| 7 | Clean-up | All | H$_2$O | 1-3 | 0.5-2 | d. |

[a] As tested; other concentrations, amounts delivered, and/or flow rates are contemplated.
b. $^{90}$Sr unretained; the $^{90}$Y-depleted load/wash solution was returned to a reservoir for eventual reuse.
c. The bulk of the $^{90}$Y product is in the first ~0.5 to ~0.7 mL elute fraction.
d. Water was flushed through all fluid transport lines and then the lines were purged with air. This included a water flush through the SL using the PP.

The flow rates may be ultimately limited by a number of factors, which may include the following: the back-pressure generated by the fluid pathways (primarily the columns); the amount of back-pressure the columns or fittings or pumps can handle prior to leaking; the amount of back-pressure the extraction chromatography resin can handle prior to bleeding excessive extractant; and the adsorption/desorption rate of the analytes on the column resins. The flow rate range indicated in Table 5 represents the two example rate values assessed. The lower flow rate may be performed for Runs 1-4, and the higher flow rate may be performed for Run 5.

The elapsed times required to perform the protocol described in Table 5 are shown in Table 6.

TABLE 6

Approximate, non-optimized elapsed times required to perform the $^{90}$Y isolation and purification process. [a]

| | | Runs 1-4 | | Run 5 | |
|---|---|---|---|---|---|
| Step | Description | Elapsed time, min | Cumulative time, min | Elapsed time, min | Cumulative time, min |
| 1 | C1 | 17 | 17 | 19 | 19 |
| 2 | C2 | | | | |
| 3 | $^{90}$Y load/wash | 22 | 39 | 15 | 34 |
| 4 | $^{90}$Y transfer | 26 | 65 | 14 | 48 |
| 5 | Wash | 9 | 74 | 6 | 54 |
| 6 | $^{90}$Y elute | 30 | 104 | 7 | 61 |
| 7 | Clean-up [b] | 20 | 124 | 20 | 81 |

[a] Indicated times include line blow-outs at each step and manual fraction collection activities (which introduced some additional time).
[b] Approximate values; elapsed times not closely tracked.

An example product solution, which had a $^{90}$Sr activity concentration of 1.25 Ci/mL, contained the stable Group II element concentrations listed in the 2nd column of Table 7 for Ca, Sr, and Ba. The Y concentration was based on the approximate mass concentration of $^{90}$Y present in a $^{90}$Sr solution of this activity concentration. The element and activity concentrations in Table 7 are but one example of a $^{90}$Sr product composition, and may not be representative of other $^{90}$Sr batches.

TABLE 7

Stable elements added to $^{90}$Sr-spiked simulated working stock, considering a target $^{90}$Sr activity concentration of 1.25 Ci/mL.

| Element | Est. conc., μg/mL | Mass in 6 mL, μg [b] | μmoles in 6 mL | Sum Group II Elements, μmoles in 6 mL | Group II: Y mole ratio |
|---|---|---|---|---|---|
| Ca | 540 | 3240 | 80.84 | | |
| Sr | 50,250 [a] | 301,500 | 3441 [a] | | |
| Ba | 20 | 120 | 0.874 | 3523 | 22,980 |
| Y | 2.30 [c] | 13.80 | 0.153 | | |

[a] Sr mass concentration includes contributions from $^{90}$Sr.
[b] Per 7.5 Ci of example
[c] Based on $^{90}$Y specific activity and activity concentration of 1.25 Ci/mL.

Given the example 1.25 Ci/mL $^{90}$Sr activity concentration, it was approximated that 6.4 mL of this solution would be required to obtain a synthetic 8 Ci $^{90}$Sr solution. A 6.0 mL sample injection loop can be installed in system 60 ("SL", FIG. 6), which can allow for routinely injecting a simulated $^{90}$Sr solution, the salt content of which would be equivalent to ~7.5 Ci $^{90}$Sr. Based on this 6.0 mL injection, the total μg (and μmoles) of the Group II elements are listed in Table 7.

$^{90}$Sr/$^{90}$Y-bearing solutions that closely simulated the elemental composition of a stock Sr bearing solution was prepared. The solution stable element compositions are listed in Tables 1 and 7 and the spiked $^{90}$Sr activity values are listed in Table 2.

The isolated $^{90}$Y produced by this (or any) purification method for medical purposes oftentimes requires a $^{90}$Y: $^{90}$Sr activity ratio of ≥1×10$^6$:1. Accordingly, for every 1 Ci $^{90}$Y in an isotope product, a maximum of 1×10$^{-6}$ Ci (1 μCi) $^{90}$Sr may be allowable. Based on the molar specific activities in Table 8, 1 μCi $^{90}$Sr is equivalent to 4.7×10−4 μmoles (0.47 nmoles) of Group II elements (see, for example, simulated $^{90}$Sr stock solution that is described in Table 7).

TABLE 8

Molar specific activity calculations for pure $^{90}$Sr and $^{90}$Y, as well as $^{90}$Sr + Group II elements in simulated aged $^{90}$Sr stock.

| Radionuclide | Specific activity (pure radionuclide) | | Specific activity (w/all Group II elements) |
|---|---|---|---|
| | μg/Ci | μmoles/Ci | μmoles/Ci |
| $^{90}$Sr | 7.28 × 10$^3$ | 8.30 × 10$^1$ | 4.70 × 10$^2$ [a] |
| $^{90}$Y | 1.84 × 10$^0$ | 2.04 × 10$^{-2}$ | |

[a] 3523 μmoles/7.5 Ci of $^{90}$Sr (per Table 7).

Using the $^{90}$Y isolation and purification processes of the present disclosure, at least a 10$^6$-fold activity enrichment of $^{90}$Y over $^{90}$Sr may be attainable. Based on the starting $^{90}$Sr activity levels present in the five test runs (1-5), the maximum $^{90}$Sr activity levels in the $^{90}$Y product fractions are shown in Table 9.

TABLE 9

$^{90}$Sr activities that were spiked into each column load solution prior to $^{90}$Y purification (as replicated in Table 2), and the required maximum $^{90}$Sr activity levels in the $^{90}$Y product fraction to achieve a 10$^6$-fold $^{90}$Y activity enrichment factor.

| Run | Run date | Determined $^{90}$Sr activity, μCi [a] | Max. $^{90}$Sr activity after $^{90}$Y purification, μCi [b] |
|---|---|---|---|
| 1 | Feb. 15, 2019 | 3.96E+2 (2.12E+0) | 3.96E−4 |
| 2 | Feb. 20, 2019 | 7.41E+2 (2.12E+0) | 7.41E−4 |
| 3 | Feb. 21, 2019 | 7.66E+2 (1.56E+0) | 7.66E−4 |
| 4 | Feb. 26, 2019 | 6.82E+2 (8.85E−1) | 6.82E−4 |
| 5 | Feb. 27, 2019 | 7.02E+2 (5.05E−1) | 7.02E−4 |

[a] Mean and (±1 s) values obtained from replicate measurements taken throughout the study interval.
[b] Maximum $^{90}$Sr activity after a 10$^6$ $^{90}$Y product enrichment factor.

The $^{90}$Y isolation and purification method (Table 5) can be performed using the system 60 shown in FIG. 6. The process can be performed five times, with $^{90}$Sr solution injections containing elevated Ca, Sr, Ba, and Y levels to simulate the levels in ~7.5 Ci of an example $^{90}$Sr product solution. $^{90}$Sr activity levels in each of the five solutions is presented in Table 9; these activities can be dissolved in 6 mL of solution, and can be injected into the fluidic system using a sample injection loop (SL, FIG. 6).

The tandem column process can include a Ln resin and a DGA resin column, respectively. Once the $^{90}$Sr/$^{90}$Y solution is loaded into the sample injection loop, in semi-automated fashion, for example, with a peristaltic pump, the $^{90}$Y isolation and purification process can be fully automated.

For Run 1, which contained the least $^{90}$Sr/$^{90}$Y activity of the five runs, a fraction collector can be employed to collect fractions of ~2 mL volume across the entire process (except for the $^{90}$Y elution step, during which <1 mL fractions were collected). The $^{90}$Y activity chromatogram is shown immediately after the conclusion of the run, and once the samples achieved secular equilibrium (FIG. 7). The first three $^{90}$Y elution fractions, representing 0.85 mL, can contain 83% of the $^{90}$Y in the injected sample.

When the $^{90}$Sr in the fractions reach equilibrium with $^{90}$Y, the profile of the unretained $^{90}$Sr, traveling from the sample injection loop and through the load/wash of column 1 can be determined. Example fractions shown can each be 2 mL in volume. The $^{90}$Sr can be in the first 6 mL volume; the next 2 mL fraction can contain the bulk of the residual $^{90}$Sr. This ~30 μCi of $^{90}$Sr may be carried from the sample injection loop as a segment of wash solution trapped between two air segments, for example. With the passing of the air segments, the $^{90}$Sr activity may be at baseline for the remainder of the column wash. Overall, 97% of the $^{90}$Sr in the load/wash fraction may be accounted for.

Runs 2 through 5 can contain approximately double the $^{90}$Sr/$^{90}$Y activity of Run 1. Some fractions (the $^{90}$Sr load effluent and the early $^{90}$Y elution), can be split into two. For the $^{90}$Sr load, the first and second 10 ml fractions can be collected (except for Run 2, in which the first 18.2 mL and the second 2.35 mL were collected). For the $^{90}$Y elution, the first 0.72 to 0.84 mL can be collected in one fraction, and the remainder of the 2.5 mL $^{90}$Y elution volume in the second fraction.

In FIG. 8 and with reference to Tables 11 and 14, for Run 2, the $^{90}$Y yield can be determined in the primary elute fraction can be 95%; the $^{90}$Sr recovery in the equilibrated primary load fraction can be 98%. In FIG. 9, for Run 3, the $^{90}$Y yield in the primary elute fraction can be 86%; the $^{90}$Sr recovery in the equilibrated primary load fraction can be 97%. In FIG. 10, for Run 4, the $^{90}$Y yield in the primary elute fraction can be 86%; the $^{90}$Sr recovery in the equilibrated primary load fraction can be 100%. In FIG. 11, for Run 5, the $^{90}$Y yield in the primary elute fraction can be 89%; the $^{90}$Sr recovery in the equilibrated primary load fraction can be 104%.

Additionally, a 2 μL aliquot of the Run 5 primary column load/wash fraction effluent can be sampled immediately upon collection. The aliquot can be added to scintillation cocktail and the resulting sample counted by liquid scintillation analyzer (LSA). This sample can be periodically counted until the sample approaches $^{90}$Sr/$^{90}$Y secular equilibrium. The LSA pulse height spectra at time "near-zero" and beyond are shown in FIG. 12. The high-energy $^{90}$Y β-emission region is apparent above the lower-energy $^{90}$Sr β-emission region beyond ~1000 channels. The time "zero" spectra indicates virtually no $^{90}$Y is present in the sample—it has been adsorbed onto the primary Ln Resin column. As time progresses, $^{90}$Y ingrowth from the $^{90}$Sr parent is observed.

Example performance of the tandem purification process is shown in Table 10 for $^{90}$Y. The table provides the total injected $^{90}$Sr/$^{90}$Y into system 60, and the determined $^{90}$Y activity across all the collected fractions. Table 11 uses the Table 10 data to calculate the total $^{90}$Y recovery across all fractions (% activity balance), and the $^{90}$Y recovery in the column 2 elution.

TABLE 10

Determined $^{90}$Y activities (μCi) obtained immediately after completion of the tandem column purification process, including fluidic system rinses and spent columns. Column 2 $^{90}$Y elution activities are in bold.

|  | Run 1 | Run 2 | Run 3 | Run 4 | Run 5 |
|---|---|---|---|---|---|
| Elapsed days [a] | 0.087 | 0.050 | 0.038 | 0.073 | 0.054 |
| Units |  | μCi |  |  |  |
| Injected activity | 3.96E+2 | 7.41E+2 | 7.66E+2 | 6.82E+2 | 7.02E+2 |
| reference [b, c] | (2.12E+0) | (2.12E+0) | (1.56E+0) | (8.85E−1) | (5.05E−1) |
| C1 Load/Wash | 2.19E+1 | 4.28E+1 | 3.82E+1 | 4.34E+1 | 3.80E+1 |
| C1→C2 Transfer | 1.01E+1 | 2.65E+1 | 1.91E+1 | 2.41E+1 | 4.03E+1 |
| C2 Wash | 3.25E−3 | 7.69E−3 | 7.53E−3 | 3.33E−3 | 7.22E−2 |
| C2 90Y Elute | 3.30E+2 | 7.01E+2 | 6.57E+2 | 5.89E+2 | 6.26E+2 |
| System Rinses | 1.76E+0 | 3.38E−1 | 2.03E−1 | 1.68E−1 | 1.57E+0 |
| Col. 1 | 5.35E−2 | 3.94E−1 | 1.83E−2 | 3.18E−2 | 4.46E−2 |

TABLE 10-continued

Determined $^{90}$Y activities (µCi) obtained immediately after completion of the tandem
column purification process, including fluidic system rinses and spent columns.
Column 2 $^{90}$Y elution activities are in bold.

|  | Run 1 | Run 2 | Run 3 | Run 4 | Run 5 |
|---|---|---|---|---|---|
| Col. 2 | 3.76E−2 | 3.83E−1 | 1.10E−1 | 9.10E−2 | 9.27E−2 |
| Sum of fractions $^d$ | 3.64E+2 | 7.71E+2 | 7.15E+2 | 6.57E+2 | 7.06E+2 |

$^a$ Elapsed time at which activity fractions were calculated.
$^b$ Small aliquot of the original $^{90}$Sr/$^{90}$Y column load solution, extrapolated to total load volume.
$^c$ Mean and (±1 s) values obtained from replicate measurements taken throughout the study interval.
$^d$ Activity sum across all collected/analyzed column effluent fractions, system rinses, and spent columns.

Across all five runs, 97.2+5.0% of the activity injected into the system can be accounted for. This+5.0% was assessed as the uncertainty in the measurement approach. Consequently, this same relative uncertainty can be used to assign uncertainties to the individual $^{90}$Y elution yields. Across all five runs, it can be determined that the mean $^{90}$Y elution fraction was 87.8+4.3% of the total injected $^{90}$Y. The $^{90}$Y yields for Run 5, which was performed at higher flow rates (for example doubled) than Runs 1-4, can result in $^{90}$Y product yields that can be statistically indistinguishable from the other runs.

TABLE 11

Assessment of $^{90}$Y radiochemical yields in the Col. 2 product
fractions following the tandem column purification process.
Percentages calculated from values in Table 10.

|  | Run 1 | Run 2 | Run 3 | Run 4 | Run 5 | Mean (±1 s) |
|---|---|---|---|---|---|---|
| Elapsed days $^a$ | 0.087 | 0.050 | 0.038 | 0.073 | 0.054 | — |
| Units | | | % | | | |
| % Act. Balance $^b$ | 91.9 | 104.1 | 93.3 | 96.3 | 100.5 | 97.2 (5.0) |
| % in C2 elute $^{c,d}$ | 83.4 (4.2) | 94.5 (4.8) | 85.8 (4.3) | 86.4 (4.4) | 89.1 (4.5) | 87.8 (4.3) |

$^a$ Elapsed time at which activity fractions were calculated.
$^b$ Ratio of $^{90}$Y activity in sum of fractions/$^{90}$Y activity in injected activity reference sample.
$^c$ Ratio of $^{90}$Y activity in C2 elute fractions/$^{90}$Y activity in injected activity reference sample.
$^d$ ± uncertainty values in ( ) were assigned based on the standard deviation for the Run 1-5 "% activity balance" (shaded cell).

The decay of each primary $^{90}$Y elution fraction for the five runs can be periodically monitored radiometrically. The activity of the initial $^{90}$Y sample can be normalized at time near-zero to "1", then calculate the activity fraction across the next ~60 days. The charts in FIG. 13 through FIG. 17 show the decaying $^{90}$Y elution fraction overlaid atop the theoretical $^{90}$Y decay rate. In all cases, the decaying $^{90}$Y elution fraction can remain atop the theoretical curve. Should any $^{90}$Sr have been present in these $^{90}$Y product fractions, the data would have begun to rise above the theoretical curve.

Upon approaching ~60 elapsed days of counting, the $^{90}$Y activity in the $^{90}$Y product fractions can became too low to accurately measure by the radiometric detector. At that point, some of the volume of the primary $^{90}$Y elution fractions may be sacrificed to inject into scintillation cocktail. The samples can then be counted across several more days by LSA. Because of the low activity levels, the samples may be counted for extended periods of time (2 h each) to obtain count rates, which may then converted to net count rates and ultimately decay units (Bq).

The decay rates from the LSA samples described above can be converted to decay rates for each analysis date; $^{90}$Y product fraction activity (Bq) results are displayed in FIG. 18. The elapsed time between the $^{90}$Y purification runs and the LSA analyses are shown in Table 12. As shown in FIG. 18, the decay rates for the samples continue to diminish over time; this is indication that the primary source of activity in the samples remains as $^{90}$Y. As such, these decay rates should continue to fall until $^{90}$Y achieves secular equilibrium with the trace levels of $^{90}$Sr present in the samples.

TABLE 12

Elapsed time between LSA count results shown in FIG. 17
and initiation of the tandem column purification.

| Run ID | Approx. elapsed days to LSA count | | |
|---|---|---|---|
|  | Apr. 24, 2019 | Apr. 29, 2019 | May 2, 2019 |
| 1 | 68 | 73 | 76 |
| 2 | 63 | 68 | 71 |
| 3 | 62 | 67 | 70 |
| 4 | 57 | 62 | 65 |
| 5 | 56 | 61 | 64 |

The LSA data in FIG. 18 can be used to calculate the $^{90}$Sr decontamination factors in the primary $^{90}$Y product fractions. As activity levels continue to drop in the LSA samples, the $^{90}$Sr decontamination factors continue to rise with time, as shown in FIG. 19.

Stocks of $^{90}$Sr bearing material can be considered a consumable item in the described process; some losses of $^{90}$Sr will be anticipated with each $^{90}$Y milking cycle. However, it is desirable to retain as much $^{90}$Sr as possible at the conclusion of the $^{90}$Y separation process. High $^{90}$Sr recoveries can be beneficial for at least two reasons: 1) unrecovered $^{90}$Sr will require additional purchases to replace losses in the stockpile, and 2) $^{90}$Sr activity levels in process effluents and peripheral components will increase the cost of waste disposal.

Therefore, in addition to obtaining a high-purity $^{90}$Y product with high yields, a method that would result in high recoveries of $^{90}$Sr at the conclusion of each purification cycle would be beneficial. Ideally, virtually all of the $^{90}$Sr would be recoverable in the effluents of the primary $^{90}$Y extraction column.

Activity results of fractions collected during the tandem column purification process (FIG. 7 through FIG. 11). Each figure presents the fractional activities near time "zero" (left-side), and near 50-60 elapsed days (right-side) following the performance of the $^{90}$Y purification process. While the left-side figures provided fractional $^{90}$Y activities, the right-side figures provided fractional $^{90}$Sr activities.

The distribution of $^{90}$Sr recovered from all the dual-column effluents and peripheral components involved in the tandem column purification process are listed in Table 13. The row titled "injected activity reference" provides the determined spiked activity of $^{90}$Sr injected into each of the five runs; they range between ~400 and ~770 µCi. The row in bold reports the $^{90}$Sr activity recovered in the column 1 $^{90}$Y load/wash effluents. The bottom row provides the sum of all $^{90}$Sr accounted for during the tandem column purification process.

TABLE 13

Determined $^{90}$Sr activities (µCi) in each portion of the tandem column purification process, including fluidic system rinses and spent columns. Recovered $^{90}$Sr activity in Col. 1 load/wash is in bold.

|  | Run 1 | Run 2 | Run 3 | Run 4 | Run 5 |
|---|---|---|---|---|---|
| Elapsed days $^a$ | 59.0 | 53.9 | 52.9 | 48.3 | 47.4 |
| Units |  |  | µCi |  |  |
| Injected activity | 3.96E+2 | 7.41E+2 | 7.66E+2 | 6.82E+2 | 7.02E+2 |
| reference $^{b, c}$ | (2.12E+0) | (2.12E+0) | (1.56E+0) | (8.85E−1) | (5.05E−1) |
| C1 Load/Wash | 3.84E+2 | 7.25E+2 | 7.45E+2 | 6.82E+2 | 7.34E+2 |
| C1→C2 Transfer | 3.93E−3 | 1.70E−2 | 2.31E−2 | 3.01E−4 | 1.73E−2 |
| C2 Wash | <MDA | <MDA | <MDA | <MDA | <MDA |
| C2 $^{90}$Y Elute | <MDA | 5.76E−4 | 7.35E−4 | 2.11E−3 | 2.78E−3 |
| System Rinses | 2.16E−1 | 7.81E−2 | 8.33E−2 | 8.43E−3 | 1.34E+0 |
| Col. 1 | 1.90E−3 | 3.85E−3 | 3.89E−3 | 4.42E−3 | 1.23E−3 |
| Col. 2 | <MDA | <MDA | <MDA | 1.08E−5 | <MDA |
| Sum of fractions $^d$ | 3.85E+2 | 7.25E+2 | 7.45E+2 | 6.82E+2 | 7.35E+2 |

$^a$ Elapsed time at which activity values were obtained.
$^b$ Small aliquot of the original $^{90}$Sr/$^{90}$Y column load solution, extrapolated to total load volume.
$^c$ Mean and (±1 s) values obtained from replicate measurements taken throughout the study interval.
$^d$ Activity sum across all collected and analyzed column effluent fractions, system rinses, and spent columns.

The data in Table 13 illustrates that virtually all of the $^{90}$Sr activity was accounted for in the column 1 load/wash fraction. The fractions with the next-highest $^{90}$Sr activities contained levels that were ≤1.8×10$^{-3}$ relative to the load/wash fraction (see "system rinses" in Run 5).

The data in Table 14 summarizes the $^{90}$Sr yields across each of the five runs. First, the fraction of $^{90}$Sr accounted for in the Table 13 "sum of fractions" vs. the "injected activity reference" values. Overall, it can be possible to account for 99.4±3.2% of the $^{90}$Sr relative to the reference aliquots that may be sampled prior to initiating the $^{90}$Y purification process. The relative uncertainty of +3.2% can be employed to assign uncertainties to the $^{90}$Sr activities accounted for in the "column 1 load/wash" fraction. Based on this, a mean $^{90}$Sr recovery of 99.3±3.1% in the column 1 load/wash effluents across all five runs can be obtained. Virtually all of the $^{90}$Sr injected into the $^{90}$Y purification process may be recoverable in the fluids emerging from the primary Ln Resin column.

TABLE 14

Assessment of $^{90}$Sr radiochemical recoveries following the tandem column method. Percentages calculated from values in Table 13.

|  | Run 1 | Run 2 | Run 3 | Run 4 | Run 5 | Mean (±1 s) |
|---|---|---|---|---|---|---|
| Elapsed days $^a$ | 59.0 | 53.9 | 52.9 | 48.3 | 47.4 | — |
| Units |  |  | % |  |  |  |
| % Act. Balance $^b$ | 97.1 | 97.8 | 97.3 | 99.9 | 104.7 | 99.4 (3.2) |
| % in C1 Load/ Wash $^{c, d}$ | 97.0 (3.1) | 97.8 (3.1) | 97.3 (3.1) | 99.9 (3.2) | 104.5 (3.3) | 99.3 (3.1) |

$^a$ Elapsed time at which activity fractions were calculated.
$^b$ Ratio of $^{90}$Sr activity in sum of fractions/$^{90}$Sr activity in injected activity reference sample.
$^c$ Ratio of $^{90}$Sr activity in C1 load & wash effluents/$^{90}$Sr activity in injected activity reference sample.
$^d$ ± uncertainty values in ( ) were assigned based on the standard deviation for the Run 1-5 "% activity balance" (shaded cell).

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for separating Y and Sr, the method comprising:
   providing a dilute acidic mixture equal to or less than 0.1M concentration of acid and comprising Y and Sr to a first vessel having a first media therein; and
   while providing the dilute acidic mixture, retaining at least some of the Y from the dilute acidic mixture within the first vessel while eluting at least some of the Sr from the dilute acidic mixture to form a dilute acidic eluent having equal to or less than 0.1M concentration of acid.

2. The method of claim 1 wherein the dilute acidic mixture comprises $^{90}$Y and $^{90}$Sr.

3. The method of claim 1 wherein the dilute acidic mixture additionally comprises stable Sr, Ca and/or Ba.

4. The method of claim 1 wherein the dilute acidic mixture comprises stockpiled Sr-bearing nuclear material.

5. The method of claim 1 wherein the first media comprises a resin.

6. The method of claim 1 wherein the first media comprises an HDEHP resin.

7. The method of claim 1 wherein the first media comprises alkylphosphorus extractants.

8. The method of claim 1 wherein the dilute acidic eluent comprises at least some Sr from the dilute acidic mixture.

9. The method of claim 1 further comprising:
providing the dilute acidic mixture from a reservoir; and
providing the dilute acidic eluent to the reservoir.

10. The method of claim 1 wherein the dilute acidic mixture further comprises Zr.

11. The method of claim 10 wherein while providing the dilute acidic mixture, further comprising retaining at least some of the Zr from the dilute acidic mixture within the first vessel.

12. The method of claim 1 wherein the dilute acidic mixture further comprises Fe.

13. The method of claim 10 wherein while providing the dilute acidic mixture, further comprising retaining at least some of the Fe from the dilute acidic mixture within the first vessel.

14. The method of claim 1 wherein the dilute acidic mixture comprises HCl.

15. The method for separating Y and Sr of claim 1, wherein the dilute acidic mixture has a $K_d$ of at least 10.

16. The method for separating Y and Sr of claim 15, wherein the concentrated acid mixture has a $K_d$ of less than 10.

* * * * *